US012555935B2

(12) United States Patent
Liu et al.

(10) Patent No.: US 12,555,935 B2
(45) Date of Patent: Feb. 17, 2026

(54) HIGH SPEED, HIGH DENSITY CABLE CONNECTOR

(71) Applicant: Amphenol Commercial Products (Chengdu) Co., Ltd., Chengdu (CN)

(72) Inventors: Yunxiang Liu, Chengdu (CN); Jianke Zeng, Chengdu (CN); Wen Te Hsu, Taoyuan (TW)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 376 days.

(21) Appl. No.: 18/033,316

(22) PCT Filed: Oct. 22, 2021

(86) PCT No.: PCT/IB2021/000742
§ 371 (c)(1),
(2) Date: Apr. 21, 2023

(87) PCT Pub. No.: WO2022/084750
PCT Pub. Date: Apr. 28, 2022

(65) Prior Publication Data

US 2023/0396005 A1 Dec. 7, 2023

Related U.S. Application Data

(63) Continuation-in-part of application No. 17/505,437, filed on Oct. 19, 2021, now Pat. No. 12,057,663.

(30) Foreign Application Priority Data

Oct. 22, 2020 (CN) ......................... 202011136063.1
Oct. 22, 2020 (CN) ......................... 202022373960.6
(Continued)

(51) Int. Cl.
*H01R 12/71* (2011.01)
*H01R 12/75* (2011.01)
(Continued)

(52) U.S. Cl.
CPC ........... *H01R 12/714* (2013.01); *H01R 12/75* (2013.01); *H01R 13/426* (2013.01); *H01R 13/6592* (2013.01)

(58) Field of Classification Search
CPC .... H01R 12/714; H01R 12/75; H01R 13/426; H01R 13/6592
(Continued)

(56) References Cited

U.S. PATENT DOCUMENTS 6,489,563 B1 12/2002 Zhao et al.
8,684,752 B2 4/2014 Hsueh
(Continued)

FOREIGN PATENT DOCUMENTS

CN 210866602 U 6/2020
CN 111555069 A 8/2020
(Continued)

OTHER PUBLICATIONS

International Search Report and Written Opinion mailed Jan. 26, 2022 for International Application No. PCT/CN2021/125254.
(Continued)

*Primary Examiner* — Gary F Paumen
(74) *Attorney, Agent, or Firm* — Wolf, Greenfield & Sacks, P.C.

(57) ABSTRACT

A connector configured to connect densely disposed cables to a board. The connector may include two or more rows of terminals held by a housing such that the two or more rows of terminals are at a same height with respect to a board that the connector would be mounted to. Such a configuration enables the connector to fit into a space limited by, for example, another component mounted to the board. The terminals may include first contact portions configured to be mounted onto a surface of the board when pressure is applied to the terminals so as to avoid the use of materials
(Continued)

200 that may cause undesired shorting such as soldering materials. The terminals may include second contact portions configured to receive the cables. The second contact portions of ground terminals of a same row may be connected by a strip configured to contact shields of cables attached to the row.

23 Claims, 20 Drawing Sheets

(30) Foreign Application Priority Data

Apr. 16, 2021 (CN) ........................ 202110412091.X
Apr. 16, 2021 (CN) ........................ 202120784796.X

(51) Int. Cl.
*H01R 13/426* (2006.01)
*H01R 13/6592* (2011.01)

(58) Field of Classification Search
USPC ........................................................... 439/66
See application file for complete search history.

(56) References Cited

U.S. PATENT DOCUMENTS

| | | | | |
|---|---|---|---|---|
| 10,381,767 | B1 | 8/2019 | Milbrand, Jr. et al. | |
| 10,680,364 | B2 | 6/2020 | Champion et al. | |
| 11,189,946 | B2 * | 11/2021 | Rubens | H01R 13/514 |
| 11,469,553 | B2 | 10/2022 | Johnescu et al. | |
| 11,469,554 | B2 | 10/2022 | Ellison et al. | |
| 11,670,879 | B2 | 6/2023 | Zerebilov | |
| 12,057,663 | B2 * | 8/2024 | Liu | H01R 13/424 |
| 2021/0159624 | A1 * | 5/2021 | Rubens | H01R 12/724 |
| 2021/0234291 | A1 | 7/2021 | Zerebilov | |
| 2021/0234314 | A1 | 7/2021 | Johnescu et al. | |
| 2021/0234315 | A1 | 7/2021 | Ellison et al. | |
| 2022/0173550 | A1 | 6/2022 | Liu et al. | |
| 2022/0407269 | A1 | 12/2022 | Ellison et al. | |
| 2023/0062661 | A1 | 3/2023 | Johnescu et al. | |

FOREIGN PATENT DOCUMENTS

| | | | |
|---|---|---|---|
| CN | 111564723 | A | 8/2020 |
| CN | 211456069 | U | 9/2020 |
| CN | 111769395 | A | 10/2020 |
| CN | 111769396 | A | 10/2020 |
| CN | 112072401 | A | 12/2020 |
| CN | 112086775 | A | 12/2020 |
| CN | 212412345 | U | 1/2021 |
| CN | 21315116 | U | 5/2021 |
| CN | 213124740 | U | 5/2021 |
| CN | 112993659 | A | 6/2021 |
| CN | 113422243 | A | 9/2021 |
| CN | 215184602 | U | 12/2021 |
| JP | 2004-039635 | A | 2/2004 |
| TW | 566712 | U | 12/2003 |
| TW | M388773 | U | 9/2010 |
| TW | M458009 | U | 7/2013 |
| TW | I475754 | B | 3/2015 |
| TW | D209874 | S | 2/2021 |
| TW | 202131555 | A | 8/2021 |
| WO | WO 2019/000183 | A1 | 1/2019 |
| WO | WO 2022/084750 | A1 | 4/2022 |

OTHER PUBLICATIONS

International Search Report and Written Opinion mailed Mar. 9, 2022 for International Application No. PCT/IB2021/000742.

No Author Listed, Specification for Quad Small Form Factor Pluggable Module 112. QSFP112 Published Specification Rev 2.0. QSFP112 Multi-Source Agreement. Jan. 22, 2022. 55 pages.

Zerebilov, High Frequency Midboard Connector filed Apr. 21, 2023 for U.S. Appl. No. 18/137,984.

* cited by examiner

HIGH SPEED, HIGH DENSITY CABLE CONNECTOR

CROSS-REFERENCE TO RELATED APPLICATIONS

This application is a 35 U.S.C. § 371 National Phase filing of International Application No. PCT/IB2021/000742, filed on Oct. 22, 2021, entitled "HIGH SPEED, HIGH DENSITY CABLE CONNECTOR," which is a continuation in part of U.S. patent application Ser. No. 17/505,437, filed on Oct. 19, 2021, entitled "INTEGRALLY SHIELDED CABLE CONNECTOR," which claims priority to and the benefit of Chinese Patent Application Serial No. 202120784796.X, filed on Apr. 16, 2021. U.S. patent application Ser. No. 17/505,437 also claims priority to and the benefit of Chinese Patent Application Serial No. 202110412091.X, filed on Apr. 16, 2021. U.S. patent application Ser. No. 17/505,437 also claims priority to and the benefit of Chinese Patent Application Serial No. 202022373960.6, filed on Oct. 22, 2020. U.S. patent application Ser. No. 17/505,437 also claims priority to and the benefit of Chinese Patent Application Serial No. 202011136063.1, filed on Oct. 22, 2020. The entire contents of these applications are incorporated herein by reference in their entirety.

FIELD

This application relates generally to electrical interconnection systems, such as those including cables, used to interconnect electronic components.

BACKGROUND OF INVENTION

Electrical connectors are used in many electronic systems. It is generally easier and more cost effective to manufacture a system as separate electronic subassemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

A known arrangement for joining several printed circuit boards is to have one printed circuit board serve as a backplane. Other printed circuit boards, called "daughterboards" or "daughtercards," may be connected through the backplane. Many connectors may be mounted to the backplane, and electrically conductive traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane.

Connectors may also be used in other configurations for interconnecting printed circuit boards. Sometimes, one or more smaller printed circuit boards may be connected to another larger printed circuit board. In such a configuration, the larger printed circuit board may be called a "motherboard" and the printed circuit boards connected to it may be called "daughterboards" or "daughtercards". Also, boards of the same size or similar sizes may sometimes be aligned in parallel. Connectors used in these applications are often called "stacking connectors" or "mezzanine connectors."

Connectors may also be used to enable signals to be routed to or from an electronic device. A connector, called an "I/O connector," may be mounted to a printed circuit board, usually at an edge of the printed circuit board. That connector may be configured to receive a plug at one end of a cable, such that the cable is connected to the printed circuit board through the I/O connector. The other end of the cable may be connected to another electronic device.

Cables have also been used to make connections within the same electronic device. The cables may be used to route signals from an I/O connector to a processor assembly that is located at the interior of printed circuit board, away from the edge at which the I/O connector is mounted. In other configurations, both ends of a cable may be connected to the same printed circuit board. The cables can be used to carry signals between components mounted to the printed circuit board near where each end of the cable connects to the printed circuit board.

Routing signals through a cable, rather than through a printed circuit board, may be advantageous because the cables provide signal paths with high signal integrity, particularly for high frequency signals, such as those above 40 Gbps using a non-return-to-zero (NRZ) protocol or greater than 50 Gbps using a PAM4 protocol. Known cables have one or more signal conductors, which are surrounded by a dielectric material, which in turn is surrounded by a conductive layer. A protective jacket, often made of plastic, may surround these components. The jacket or other portions of the cable may include fibers or other structures for mechanical support.

One type of cable, referred to as a "twinax cable," is constructed to support transmission of a differential signal and has a balanced pair of signal wires embedded in a dielectric and encircled by a conductive layer. The conductive layer is usually formed using foil, such as aluminized Mylar. The twinax cable can also have a drain wire. Unlike a signal wire, which is generally surrounded by a dielectric, the drain wire may be uncoated so that it contacts the conductive layer at multiple points over the length of the cable. At an end of the cable, where the cable is to be terminated to a connector or other terminating structure, the protective jacket, dielectric and the foil may be removed, leaving portions of the signal wires and the drain wire exposed at the end of the cable. These wires may be attached to a terminating structure, such as a connector. The signal wires may be attached to conductive elements serving as mating contacts in the connector structure. The foil may be attached to a ground conductor in the terminating structure, either directly or through the drain wire, if present. In this way, any ground return path may be continued from the cable to the terminating structure.

High speed, high bandwidth cables and connectors have been used to route signals to or from processors and other electrical components that process a large number of high speed, high bandwidth signals. These cables and connectors reduce the attenuation of the signals passing to or from these components relative to what might occur were the same signals routed through a printed circuit board.

SUMMARY OF INVENTION

Aspects of the present disclosure relate to high speed, high density cable connectors.

Some embodiments relate to a connector. The connector may include a housing comprising an opening at a face and one or more connection mechanisms configured to hold the housing onto a printed circuit board; and a plurality of terminals each of the plurality of terminals comprising a first contact portion extending through the opening and curving away from the face, a second contact portion opposite the first contact portion, and an intermediate portion extending between the first contact portion and the second contact portion, the intermediate portion comprising a first portion extending substantially parallel to the face and a second portion extending in an angle relative to the first portion such that the first contact portion makes contact with the printed circuit board through pressure applied by at least a portion of the housing.

In some embodiments, the housing may include a cover configured to apply the pressure when in a closed state.

In some embodiments, the housing may include an angled surface configured to apply the pressure when the plurality of terminals are inserted into the housing.

In some embodiments, the connector may further include a terminal assembly comprising the plurality of terminals; and an over molded plastic portion that extends over the plurality of terminals within the housing.

In some embodiments, the plurality of terminals may be disposed in alternating signal pairs and ground pairs.

In some embodiments, the second contact portions of the ground pairs may extend beyond the second contact portions of the signal pairs.

In some embodiments, the connector may include a strip connecting the second contact portions of the ground pairs.

In some embodiments, for each of the signal pairs: the second portion of the intermediate portion of one terminal of the signal pair may extend in a first angle relative to the first portion of the intermediate portion, the second portion of the intermediate portion of the other terminal of the signal pair may extend in a second angle relative to the first portion of the intermediate portion, and the second angle may be different from the first angle.

In some embodiments, for each of the ground pairs: the second portion of the intermediate portion of one terminal of the ground pair may extend in the first angle relative to the first portion of the intermediate portion, and the second portion of the intermediate portion of the other terminal of the ground pair may extend in the second angle relative to the first portion of the intermediate portion.

Some embodiments relate to a method of connecting signal leads and ground leads from cables to a PCB using a connector. The method may include preparing the cables for connecting to terminal assemblies, wherein the preparing comprises: removing a portion of an outer protective cover from the cables; cutting or trimming a portion of a shield and drain wire; and removing a portion of a dielectric surrounding conductors of the cables; connecting the cables to the terminal assemblies, wherein the connecting comprises: soldering or welding the signal leads onto respective signal terminals for each of the cables; and securing the cables to the terminal assembly at the first end, either directly, or by a clamp portion, to connect any of the ground shield or a drain wire for each of the cables to a ground terminal supporting portion, wherein ground terminals extend from the ground terminal supporting portion to the second end of the terminal assembly; mounting or affixing the terminal assemblies within a base housing; positioning the base housing onto a mating surface of the PCB; positioning a cover on the base housing; and attaching the cover to the PCB to constrain the housing and compress the contact tips of the terminals against mating terminals on the PCB.

In some embodiments, each of the terminal assemblies may include a supporting portion at a first end; a plurality of terminals extending from the supporting portion at the first end toward a second end opposite the first end; and a dielectric over molded portion that extends over the plurality of terminals within a region located between the first end and the second end; wherein for a portion of the plurality of terminals, in a region located between the over molded portion and the first end, connections between the terminal and each of the other of the plurality of electrically connected terminals are severed.

In some embodiments, the terminal ends may extend toward the PCB in an inclined degree.

Some embodiments relate to a terminal assembly. The terminal assembly may include a plurality of terminals aligned in a row, the plurality of terminals comprising pairs of signal terminals separated by ground terminals, each of the plurality of terminals comprising a first contact portion, a second contact portion opposite the first contact portion, and an intermediate portion extending between the first contact portion and the second contact portion, the second contact portions of the ground terminals extending beyond the second contact portions of the signal terminals; and a strip connecting the second contact portions of the ground terminals.

In some embodiments, the terminal assembly may further include a dielectric over molded portion that extends over the plurality of terminals within a region located between the first contact portion and the second contact portion.

In some embodiments, the terminal assembly may further include one or more clamp portions attached to the strip and configured to contact shielding of one or more cables.

Some embodiments relate to a cable assembly. The cable assembly may include the terminal assembly; and a plurality of cables, each cable comprising a pair of signal conductors and a shield surrounding the pair of signal conductors, wherein the pair of signal conductors of each cable is mounted on the second contact portions of a respective pair of signal terminals, and the shield of each cable is electrically connected to the ground terminals through contacting the strip.

In some embodiments, the second contact portions of the ground terminals may be bent downwards by the radius of the cable, such that the signal conductors of the cables are aligns with the second contact portions of the signal terminals and the strip aligns with the shields of the cables.

In some embodiments, the terminal assembly may include one or more clamp portions connecting the shields of the cables to the strip.

In some embodiments, a housing of the terminal assembly may include a first member projecting from a top surface toward the one or more clamp portions such that the first member can push the one or more clamp portions against the strip when pressure is applied to the top surface.

In some embodiments, the housing of the terminal assembly may include a second member projecting from a bottom surface toward the one or more clamp portions such that the second member can push the strip against the one or more clamp portions when pressure is applied to the top surface.

Some embodiments relate to a method of terminating a plurality of cables to a terminal assembly. The method may include stamping an electrically conductive terminal assembly, wherein the terminal assembly comprises: a supporting portion at a first end; and a plurality of terminals extending from the supporting portion at the first end toward a second end opposite the first end; over molding portions of the plurality of terminals with a dielectric material within a region located between the first end and the second end; welding a clamp portion onto a surface of the supporting portion; and for a portion of the plurality of terminals, in a region located between the over molded portion and the first end, severing a connection between the terminal and each of the other of the plurality of electrically connected terminals.

In some embodiments, the supporting portion may be a ground element.

In some embodiments, the terminals that extend from the ground element may be ground terminals that extend to the second end for connection to the PCB.

In some embodiments, the supporting portion may support one or more cables.

In some embodiments, the method may further include connecting a cable ground ring to the supporting portion, for connection to ground shielding of one or more cables.

Some embodiments relate to a connector. The connector may include a housing comprising a top surface and a bottom surface opposite to the top surface; and a plurality of terminals each comprising a first contact portion, a second contact portion opposite the first contact portion, and an intermediate portion extending between the first contact portion and the second contact portion, the plurality of terminals comprising a first plurality disposed in a first row and a second plurality disposed in a second row parallel to the first row, the first row and the second row having a same height with respect to the bottom surface of the housing.

In some embodiments, the housing may include a base housing having a lower surface for mounting on a printed circuit board.

In some embodiments, the first and second rows of terminals may be laterally staggered with respect to each other.

Some embodiments relate to a cable assembly. The cable assembly may include the connector; a first plurality of cables connected to the first row of terminals; and a second plurality of cables connected to the second row of terminals, wherein cables connected to one of the rows pass over the cables connected to the other of the rows.

In some embodiments, the first plurality of cables and the second plurality of cables may extend from a same axial end of the housing.

In some embodiments, a jacket of each of the first plurality of cables may be adjacent to a jacket of a respective one of the second plurality of cables.

Some embodiments relate to a method of connecting signal leads and ground leads from cables to a PCB using a connector. The method may include preparing the cables for connecting to a plurality of terminal assemblies, wherein the preparing comprises: removing a portion of an outer protective cover from the cables; cutting or trimming a portion of the shield and drain wire; and removing a portion of dielectric surrounding conductors of the cables; connecting the cables to the terminal assemblies, wherein the connecting comprises: soldering or welding the signal leads onto respective signal terminals for each of the cables; and securing the cables to the terminal assemblies at the first end, either directly, or by a clamp portion, to connect any of the ground shield or a drain wire for each of the cables to a ground terminal supporting portion, wherein ground terminals extend from the ground terminal supporting portion to the second end of the terminal assembly; mounting or affixing the terminal assemblies within a base housing, wherein the terminal assemblies are axially arranged in fore and aft rows within the base housing, and wherein the rows are arranged at the same height within the base housing; positioning the base housing onto a mating surface of the PCB; and positioning a cover on the base housing.

In some embodiments, terminals may extend through a terminal access region for connection to mating terminals on the PCB.

In some embodiments, the rows of terminal assemblies may be laterally staggered with respect to each other.

In some embodiments, cables connected to one of the rows may pass over the cables the other of the rows.

In some embodiments, the terminal assemblies may be laterally staggered with respect to each other.

In some embodiments, cables connected to the first row and cables connected to the second row may extend from the same axial end of the housing.

Some embodiments relate to a frame for connecting a connector to a printed circuit board (PCB), the connector having locking parts on a housing, and terminals extending below the housing. The frame may include one or more members affixable to a surface of the PCB; and one or more elastic lock portions, wherein, when the one or more members are affixed to the surface of the PCB, the connector is configured to slide axially into the frame so that the locking parts on the connector engage with the one or more elastic lock portions and the terminals contact mating terminals on the PCB.

In some embodiments, the frame may be electrically isolated from both the PCB and the connector.

In some embodiments, the frame may be a single integrated component.

In some embodiments, the frame may be assembled from two metal parts.

In some embodiments, the frame may further include an end stop formed in a rear end of the frame.

In some embodiments, the end stop may limit axial movement of a back wall of the connector during installation of the connector.

In some embodiments, each of the locking parts may recessed from lateral sides of the frame inward.

In some embodiments, the frame may include an end stop located on a front entry side of the frame.

Some embodiments relate to a method for establishing electrical connections between a connector to a printed circuit board (PCB) using a frame. The method may include installing the frame onto a mating surface of the PCB; and slidably installing the connector, including a top cover of the connector, into a locked position, wherein locking parts on the connector are engaged with matching lock portions on the frame, so that connector terminals extending below the connector slidably contact mating terminals on the PCB.

In some embodiments, the frame is electrically isolated from the PCB and the connector.

In some embodiments, the frame is a separate component, and is affixed to the PCB.

In some embodiments, both lateral sides of the connector include locking parts, which correspond to lock portions on the frame.

In some embodiments, the frame may be a single integrated component.

In some embodiments, the frame may be assembled from two metal parts.

In some embodiments, the frame may be an end stop formed in a rear end of the frame.

In some embodiments, the end stop may limit axial movement of a back wall of the connector during installation of the connector.

In some embodiments, the locking parts of the frame may be formed by recessing the lateral sides of the frame inward.

In some embodiments, the frame may include an end stop located on a front entry side of the frame.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
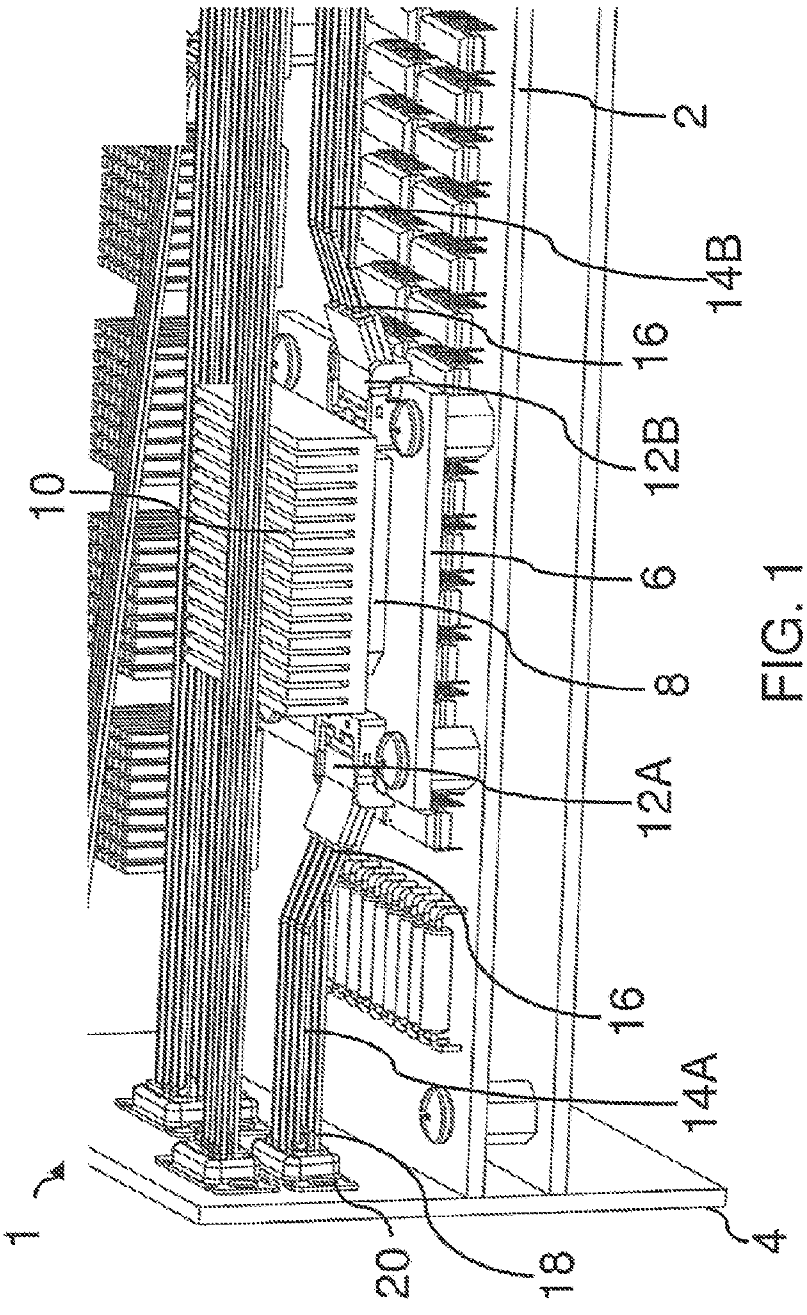
FIG. 1 is a perspective view of a portion of an illustrative embodiment of an electronic system with cables routing signals between I/O connectors and a printed circuit board PCB.

The inventors have recognized and appreciated designs for cabled interconnections that enable efficient manufacture of densely packaged, high performance electronic devices, such as servers, switches, and/or communications devices. These cabled interconnections support a high density of high-speed signal connections to processors, ASICs and other components mounted at interior regions of a printed circuit board (PCB) of an electronic device. That printed circuit board may be a motherboard or may be a daughter-card or other printed circuit board mounted in a mezzanine configuration. Such a cabled interconnection may include cables, terminated to a connector that can be mounted to the PCB, such as with a pressure mount connection. The other end of cables may be connected to an I/O connector or to another location within the electronic device remote from the PCB. As the cables may carry high-speed signals with high signal integrity over long distances, the components at the interior of the PCB may be connected to these other locations with high signal integrity. A compact connector, that may be easily manufactured and reliably mounted at an interior region of a PCB, facilitates use of such interconnects.

Such a compact connector may form a pressure mount connection to the PCB, and may be short enough to fit under a heatsink on a high performance component, such as a processor or ASIC. Similarly, a short connector may fit under a daughter board mounted in a mezzanine configuration, which may contain or be used near high performance components.

In some embodiments, a connector may include two or more rows of terminals held by a housing. The housing may include a bottom surface configured to face a PCB and a top surface opposite the bottom surface. The terminals may each include a first contact portion, a second contact portion opposite the first contact portion, and an intermediate portion extending between the first contact portion and the second contact portion. The first contact portions may be configured to mount to the PCB. The second contact portions may be configured to connect with cables. The second contact portions of the two or more rows of terminals may have a same height with respect to the bottom surface of the housing and/or a surface of the PCB. Such a configuration enables the connector to fit into a space limited by, for example, another component mounted to the PCB. Such a configuration also enables densely disposing the cables connected to the second contact portions of the terminals. In some embodiments, the cables may extend from a same axial end of the housing. In some embodiments, jackets of at least some of the cables may be adjacent to each other.

In some embodiments, the first contact portions of the terminals may be configured to be mounted onto the surface of the PCB when pressure is applied to the terminals. In this configuration, the connector may be mount to the PCB without using soldering materials as was used in conventional surface mount connectors. Cable connectors as described herein, in comparison to such conventional connectors, have higher density and higher tolerance to manufacturing errors, which lead to undesired shorting through soldering materials in conventional connectors especially, for example, at high density.

In some embodiments, the housing may include one or more openings at the bottom surface. The first contact portions of the terminals may extend through a respective opening at the bottom surface of the housing, and curve away from the bottom surface of the housing. The intermediate portion of the terminals may include a first portion extending substantially parallel to the bottom surface of the housing and a second portion extending in an angle relative to the first portion. The angle may be in the range of 0 to 90 degrees. The angle may change when the first contact portion mounted onto the surface of the PCB.

In some embodiments, the cable connector may include an integrally formed shield mechanism, which provides consistent shielding at connection areas where the cables are mounted to the second contact portions of the terminals and therefore improves signal transmission performance. The shield mechanism may also aid in terminating cables to the cable connector by facilitating mechanical connection of the cable to the terminals of the connector as well as forming electrical connections between cable shields and terminals serving as grounds within the connector.

In some embodiments, for each row, the shield mechanism may include ground terminals in the row and a strip connecting the second contact portions of the ground terminals in the row. In some embodiments, the shield mechanism may include one or more shield members that at least partially surround respective cable shields. The one or more shield members may connect the cable shields to the strip, and may include holding mechanisms for enhancing the forces applied to the cable shields. In some embodiments, the second contact portions of the ground terminals may bend downward by, for example, the radius of the cable, such that the signal conductors of the cables are aligns with the second contact portions of the signal terminals and the strip aligns with the cable shields. Such a configuration avoids jogging cable wires adjacent the connection areas and therefore improves signal integrity by increasing the consistency of the transmission path.

In some embodiments, the pressure for mounting the first contact portions of the terminals may be applied at least in part through mechanisms holding the connector onto the PCB. In some embodiments, the housing may include connection mechanisms configured to hold the housing onto the PCB that the connector is mounted to. Alternatively or additionally, the housing may be installed into a frame configured to hold onto the PCB that the connector is mounted to. In some embodiments, the housing may include members projecting from the top surface and bottom surface, respectively, and toward the shield members, such that the shield members and the strip may be pushed against each other by the projecting members.

In some embodiments, for each row, the second portions of the intermediate portions of the terminals may be disposed in first and second sub-rows in an alternative fashion. The second portions of the intermediate portions of the terminals in the first sub-row extend in a first angle relative to respective first portions of the intermediate portions. The second portions of the intermediate portions of the terminals in the second sub-row extend in a second angle relative to respective first portions of the intermediate portions. The second angle is different from the first angle. Such a configuration increases distances between the first contact portions of adjacent terminals and therefore enables disposing the terminals more tightly together.

In some embodiments, for each row, the terminals may be disposed in signal pairs separated by ground pairs. Such a configuration enables a wider ground for better shielding and the same beam properties for the terminals in a row at the same time.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view, respectively of an illustrative electronic system 1 in which a cabled connection is made between a connector mounted at the panel 4 of a printed circuit board 2, which here is a motherboard, and a midboard connector 12A mated to a printed circuit board, which here is a daughterboard 6 mounted in a midboard region above printed circuit board 2. In the illustrated example, the midboard connector 12A is used to provide a low loss path for routing electrical signals between one or more components, such as component 8, mounted to daughterboard 6 and a location off the printed circuit board 2. Component 8, for example, may be a processor or other integrated circuit chip. However, any suitable component or components on daughterboard 6 may receive or generate the signals that pass through the midboard connector 12A.

In the illustrated example, the midboard connector 12A couples signals to and from component 8 through an I/O connector 20 mounted in panel 4 of an enclosure. The I/O connector may mate with a transceiver terminating an active optical cable assembly that routes signal to or from another device. Panel 4 is shown to be orthogonal to printed circuit board 2 and daughterboard 6. Such a configuration may occur in many types of electronic equipment, as high speed signals frequently pass through a panel of an enclosure containing a printed circuit board and must be coupled to high speed components, such as processors or ASICS, that are further from the panel than high speed signals can propagate through the printed circuit board with acceptable attenuation. However, a midboard connector may be used to couple signals between a location in the interior of a printed circuit board and one or more other locations, either internal or external to the enclosure.

In the example of FIG. 1, midboard connector 12A mounted at the edge of daughterboard 6 is configured to support connections to an I/O connector 20. As can be seen, cabled connections, for at least some of the signals passing through I/O connectors in panel 4, connect to other locations with the system. For example, there is a second connector 12B, making connections to daughterboard 6.

Cables 14A and 14B may electrically connect midboard connectors 12A and 12B to locations remote from component 8 or otherwise remote from the location at which midboard connectors 12A or 12B are attached to daughterboard 6. In the illustrated embodiment of FIG. 1, first ends 16 of the cables 14A and 14B are connected to the midboard connector 12A or 12B, second ends 18 of the cables are connected to an I/O connector 20. I/O connector 20, however, may have any suitable function and/or configuration, as the present disclosure is not so limited. In some embodiments, higher frequency signals, such as signals above 10 GHz, 25 GHz, 56 GHz or 112 GHz may be connected through cables 14A and/or 14B, which may otherwise be susceptible to signal losses at distances greater than or approximately equal to six inches.

Cables 14B may have first ends 16 attached to midboard connector 12B and second ends 18 attached to another location, which may be a connector like I/O connector 20 or other suitable configuration. Cables 14A and 14B may have a length that enables midboard connector 12A to be spaced from second ends 18 at I/O connector 20 by a first distance. In some embodiments, the first distance may be longer than a second distance over which signals at the frequencies passed through cables 14A could propagate along traces within PCB 2 and daughterboard 6 with acceptable losses. In some embodiments, the first distance may be at least 6 inches, in the range of 1 to 20 inches, or any value within the range, such as between 6 and 20 inches. However, the upper limit of the range may depend on the size of PCB 2.

Taking midboard connector 12A as representative, the midboard connector 12A may be mated to a printed circuit board, such as daughterboard 6, near components, such as component 8, which receive or generate signals that pass through cables 14A. As a specific example, midboard connector 12A may be mounted within six inches of component 8, and in some embodiments, within four inches of component 8 or within two inches of component 8. Midboard connector 12A may be mounted at any suitable location at the midboard, which may be regarded as the interior regions of daughterboard 6, set back equal distances from the edges of daughterboard 6 so as to occupy less than 100% of the area of the daughterboard 6. Such an arrangement may provide a low loss path through cables 14A. In the electronic device illustrated in FIG. 1, the distance between midboard connector 12A and component 8 may be of the order of 1 inch or less.

In some embodiments, midboard connector 12A may be configured for mating to a daughterboard 6 or other PCB in a manner that allows for ease of routing of signals coupled through the connector. For example, an array of signal pads to which terminals of midboard connector 12A are mated may be spaced from the edge of daughterboard 6 or another PCB such that traces may be routed out of that portion of the footprint in all directions, such as towards component 8.

According to the embodiment of FIG. 1, connector 12A includes cables 14A aligned in multiple rows at first ends 16. In the depicted embodiment, cables are arranged in an array at first ends 16 attached to midboard connector 12A. Such a configuration, or another suitable configuration selected for midboard connector 12A, may result in relatively short breakout regions that maintain signal integrity in connecting to an adjacent component in comparison to routing patterns that might be required were those same signals routed out of an array with more rows and fewer columns.

As shown in FIG. 1, the midboard connector 12A may fit within a space that might otherwise be unusable within electronic system 1. In this example, a heat sink 10 is attached to the top of processor or component 8. Heatsink 10 may extend beyond the periphery of component 8, where, for example, component 8 may be a processor. As heat sink 10 is mounted above daughterboard 6, there is a space between portions of heatsink 10 and daughterboard 6. However, this space has a height H, which may be relatively small, such as 5 mm or less, and a conventional connector may be unable to fit within this space or may not have sufficient clearance for mating. However, at least a portion of the midboard connector 12A and other connectors of exemplary embodiments described herein may fit within this space adjacent to component 8. For example, a thickness of a connector housing may be between 3.5 mm and 4.5 mm. Such a configuration uses less space on daughterboard 6 than if a connector were mounted to daughterboard 6 outside the perimeter of heatsink 10. Such a configuration enables more electronic components to be mounted to daughterboard 6 to which the midboard connector is connected, increasing the functionality of electronic system 1. Alternatively, the daughterboard 6, which may comprise a printed circuit board that is distinct from printed circuit board 2, may be made smaller, thereby reducing its cost. Moreover, the integrity with which signals pass from connector 12A to component 8 may be increased relative to an electronic device in which a conventional connector is used to terminate cables 14A, because the length of the signal path through daughterboard 6 is reduced.

While the embodiment of FIG. 1 depicts a connector connecting to a daughter card at a midboard location, it should be noted that connector assemblies of exemplary embodiments described herein may be used to make connections to other substrates and/or other locations within an electronic device.

As discussed herein, midboard connector assemblies may be used to make connections to processors or other electronic components. Those components may be mounted to a printed circuit board or other substrate to which the midboard connector might be attached. Those components may be implemented as integrated circuits, with for example one or more processors in an integrated circuit package, including commercially available integrated circuits known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores in one package such that one or a subset of those cores may constitute a processor. Though, a processor may be implemented using circuitry in any suitable format.

In the illustrated embodiment, a component (e.g., processor) is illustrated as a packaged component separately attached to daughterboard 6, such as through a surface mount soldering operation. In such a scenario, daughterboard 6 serves as a substrate to which midboard connector 12A is mated. In some embodiments, the connector may be mated to other substrates. For example semiconductor devices, such as processors, are frequently made on a substrate, such as semiconductor wafer. Alternatively, one or more semiconductor chips may be attached, such as in a flip chip bonding process, to a wiring board, which may be a multi-layer ceramic, resin or composite structure. The wiring board may serve as a substrate. The substrate for manufacture of the semiconductor device may be the same substrate to which the midboard connector is mated.

Electronic systems as illustrated in FIG. 1 may be constructed with connectors such as 12A and 12B implemented with a connector, such as might be mounted to daughterboard 6, and a cable connector that mates with the connector.

Previous approaches to provide high speed connectors often required increasing the amount of soldered terminals in order to increase transmission speed. However, such approaches can be problematic, as it is hard to check the quality of solder connections when such terminals are soldered directly to a PCB, i.e., it is hard to efficiently access and check the connection status between a PCB and a soldered terminal. In addition, if a quality issue is detected, it is also hard to rework the faulty connection, or to replace the problem connector. Furthermore, such repairs may result in damage to the PCB itself.

Figure 2:
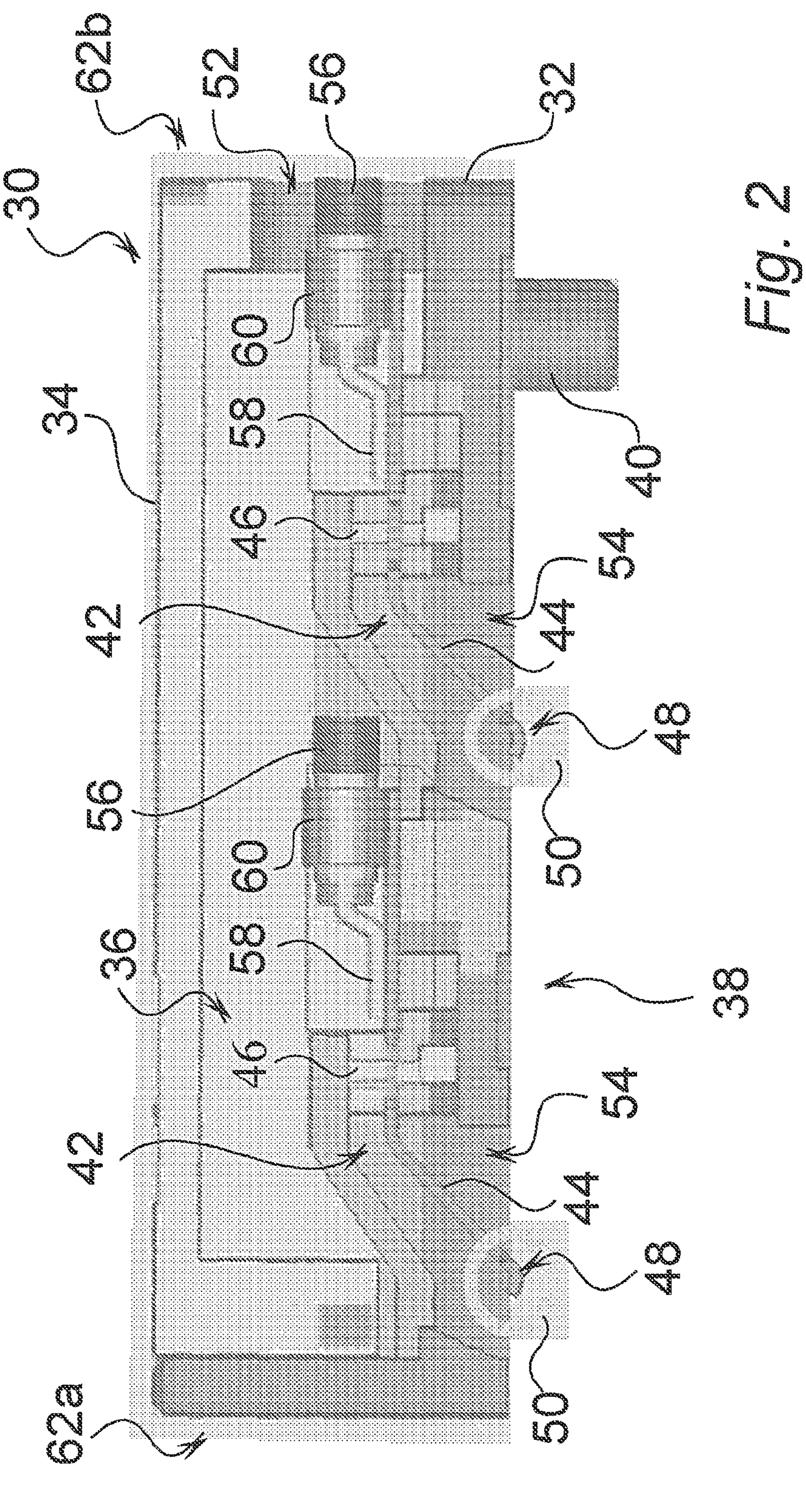
FIG. 2 is a partial side cutaway view of an exemplary embodiment of a connector.
Figure 3:
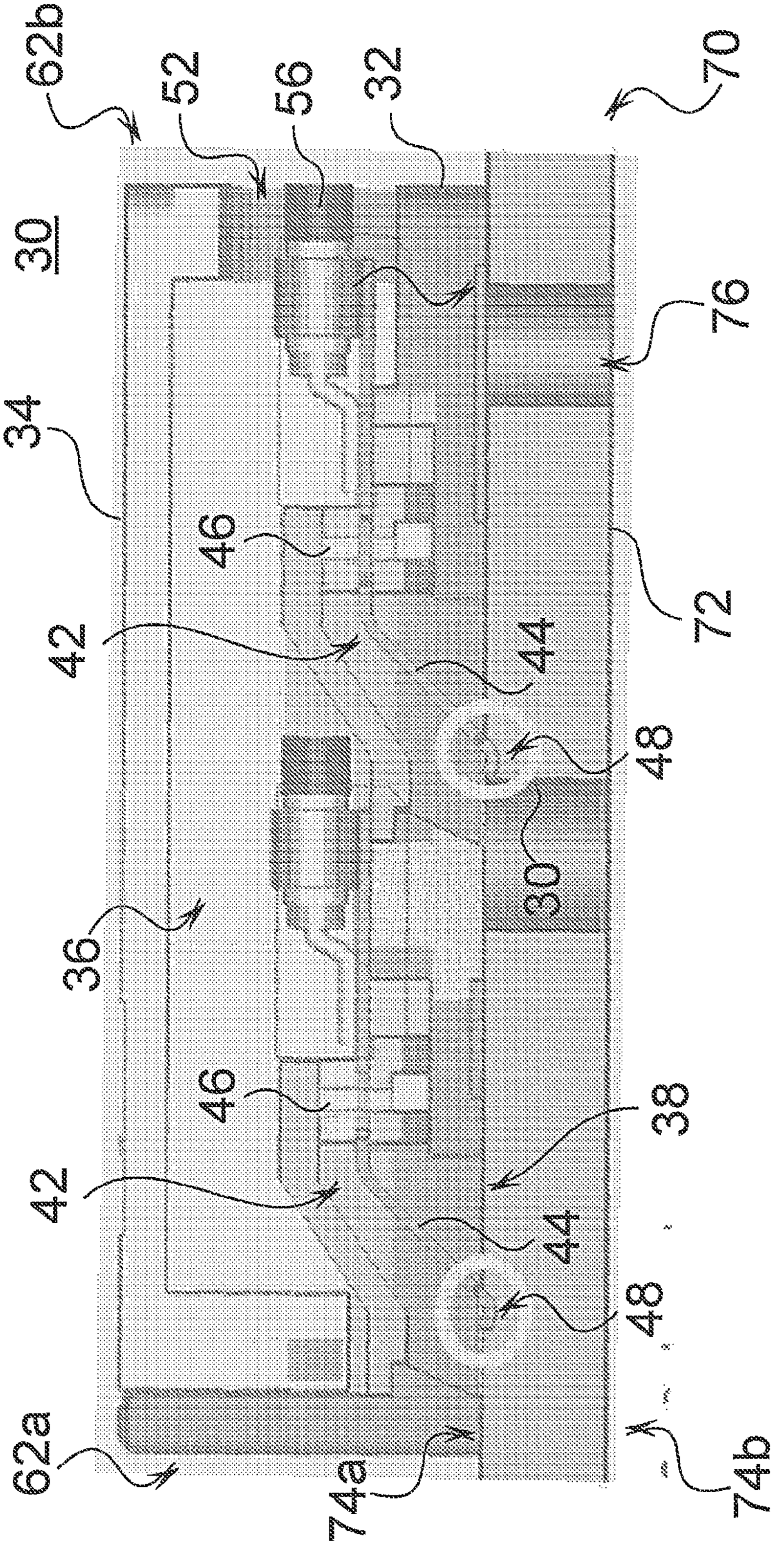
FIG. 3 is a partial side cutaway view of an exemplary embodiment of a connector that is mounted to a printed circuit board (PCB)

FIG. 2 is a partial side cutaway view of an illustrative embodiment of a connector 30. FIG. 3 is a schematic view of a connector 30 installed on a printed circuit board (PCB) 72. As seen in FIG. 2, the connector 30 includes a housing 32, a cover 34, and one or more terminal assemblies 42 that are mounted or otherwise affixed or constrained within an interior region 36 that is defined between the cover 34 and the housing 32.

Figure 4:
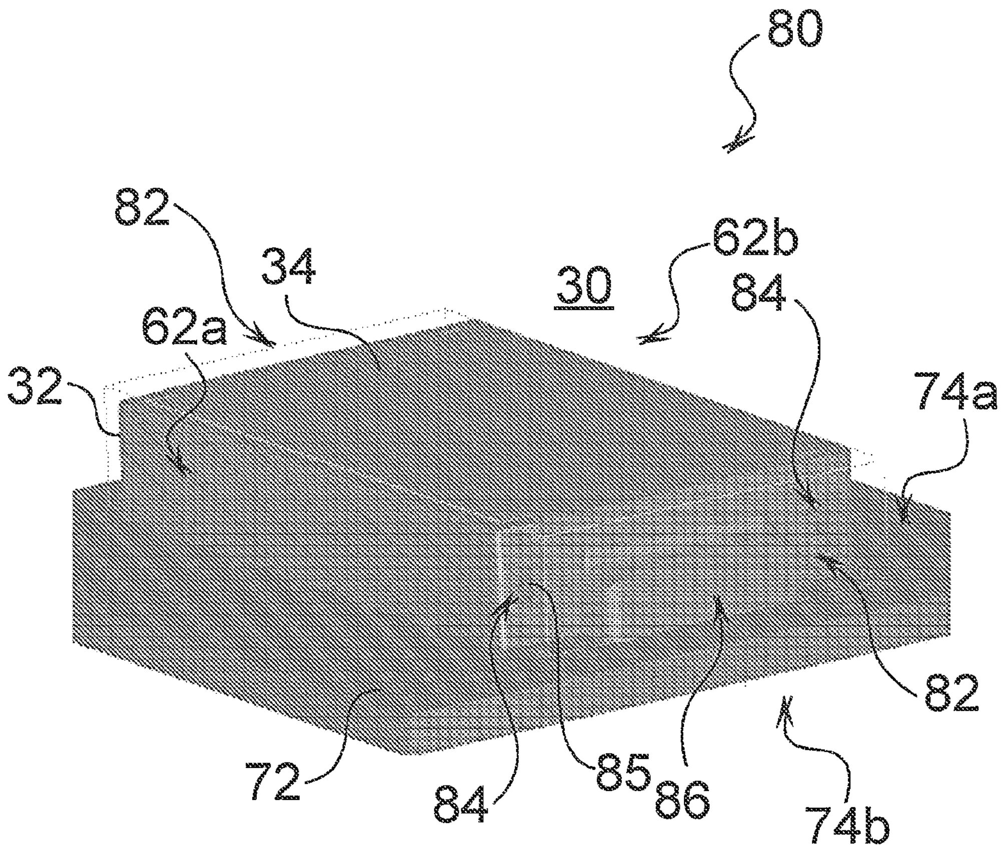
FIG. 4 is a schematic view of an exemplary embodiment of a connector installed on a printed circuit board (PCB) using a cover that includes a connection mechanism to affix the connector to the PCB.
Figure 5:
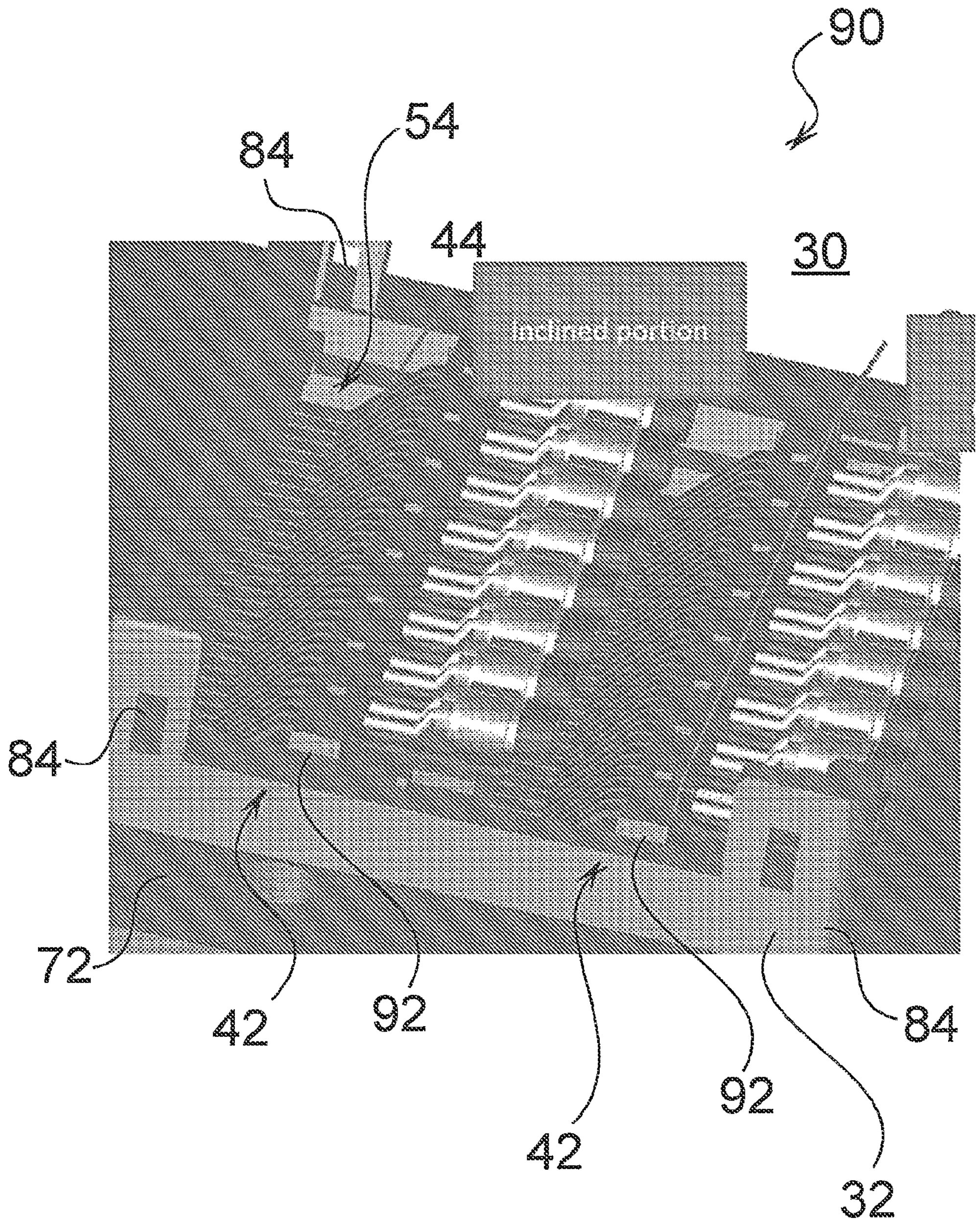
FIG. 5 is an illustrative view of terminal assemblies installed within an exemplary embodiment of a connector base of a connector, wherein the terminal ends extend through the base at an inclined angle for connection to mating electrically conductive terminals on a PCB.

FIG. 4 is a schematic view 80 of an exemplary embodiment of a connector 30 installed on a printed circuit board (PCB) 72, using a cover 34 that includes a connection mechanism 86 to affix the connector 30 to the PCB 72. For example, the front surface 62*a* of a cover 34 may be located opposite a cable access region 52 (FIG. 2, FIG. 3) on a rear surface 62*b* of a housing 32, and in the embodiment seen in FIG. 4, the connection mechanism 86 may extend from one or both lateral surfaces 82 of the cover 34, such that the connection mechanism 86 can be used to affix the connector to the PCB 72, e.g., with a mating boss, tab or fastener. As seen in FIG. 4 and FIG. 5, the housing 32 may include latch details 84 by which the cover 34, which may include mating latches 85, can be secured to the housing 32. In some embodiments, the mating latch elements 84, 85 may provide a snap fit, and may also be unsnapped, such as for inspection, repair, and/or removal.

FIG. 5 is an illustrative view 90 of terminal assemblies 42 installed within an exemplary embodiment of a base housing 32 of a connector 30, wherein the terminals 106*a*,106*b*,108 (FIG. 6) extend downward at an inclined degree as shown in inclined section 44 (FIG. 2, FIG. 3) through the terminal access region 54 to define contact tips 48 within a lower region 50, for connection to mating electrically conductive terminals on a contact surface of surface 74, e.g., 74*a* or 74*b*, of a PCB 72. As seen in FIG. 5, the terminal assemblies 42 may be arranged in fore and aft rows 204 (FIG. 9) within the interior 36 of the housing 32.

As seen in FIG. 2 and FIG. 3, a mating surface 38 is defined on the lower region of the housing 32 and may be configured to be positioned and mounted on a planar surface, e.g., 74*a*, of a printed circuit board (PCB) 72. For example, the housing 32 seen in FIG. 2 may include one or more bosses 40, such as for accurately positioning the housing 32 with respect to corresponding holes 76 that extend between opposing surfaces 74*a* and 74*b* of a PCB 72.

The exemplary terminal access region 54 seen in FIG. 2 and FIG. 3 is defined through the mating surface 38 of the housing 32, such that inclined signal terminals, such as 106*a*, 106*b* (FIG. 8) and ground terminals 108 (FIG. 6) can extend through the terminal access region 54, beyond the bottom of the mating surface 38, to define electrically conductive contact tips 48 for solderless connection to corresponding terminals on the PCB 72.

The illustrative terminal assemblies 42 seen in FIG. 2 and FIG. 3 may comprise a plurality of terminals that extend from a supporting portion 102 to a terminal contact portion located on contact tips 48, and an overmolded portion 46 that extends laterally across the terminals 105,108. For example, the overmolded portion 46 may be dielectric, and may be comprised of plastic. The signal terminals 106*a*, 106*b* and ground terminals 108 for a terminal assembly 42 may be stamped with a die from a single piece of metal. Those structures may include a plurality of terminals 106*a*, 106*b*,108 extending axially from the supporting portion. A dielectric may be used to form the overmolded portion 46 that extends over the plurality of terminals 105,108, such that the plurality of terminals are physically supported by the overmolded portion 46. At least a portion of the terminals, such as signal terminals 106*a*, 106*b*, may then be physically and electrically severed from the ground terminal supporting portion 102 (e.g., by removing tie bars). A clamp portion 126, such as comprising generally cylindrical metal clips (FIG. 7) may be welded, soldered or otherwise affixed, either directly to a ground terminal supporting portion 102 of the plurality of terminals, indirectly to the ground terminal supporting portion 102 through clamp portion 126 if used, such as for connection to shield 124 (e.g., for shielding one or more cables). Cable conductors 58, e.g., 58*a*,58*b* (FIG. 7) of one or more cables 56, for example, biaxial cables, may be welded or soldered 410 (FIG. 16) to solder tails of each of the plurality of signal terminals 108. The shield 124 may be attached to the ground terminal supporting portion 102, such as by one or more cylindrical metal clips of clamp portion 126, for example. The terminal assembly including the overmolded portion 46 and ground conductor may be inserted into a connector housing 32, where the tabs 114 (FIG. 6) are received in corresponding slots 92 (FIG. 5) so that the terminal assembly 42 is secured in the connector housing. The inclined section 44 of the terminals 106*a*,106*b*, 108 are disposed in a plane relative to a mating surface 38 (e.g., in the range of 5 degrees to 95 degrees including, for example, between 10 and 80 degrees, between 20 and 70 degrees, or between 30 and 60 degrees).

An exemplary connector 30 may therefore comprise a housing 32 having a mating surface 38 for mounting on a surface 76*a* of a printed circuit board (PCB) 72 having electrically conductive contacts, a plurality of terminals 106*a*,106*b*,108, wherein each of the terminals 106*a*,106*b*, 108 comprises a first portion located within the housing 30, an inclined section 44 inclined downward relative to the first portion, and contact tips 48 that extends through and beyond the mating surface 38 of the housing 32 for solderless connections between the terminals and electrically conductive contacts on the PCB 72, and a cover attached to the housing, wherein the cover is affixable to the PCB. In some embodiments, the cover applied a compressive force between the contact tips 48 of the terminals and the electrically conductive contacts on the PCB 72. In some embodiments, the connector 30 includes one or more terminal assemblies 42 which are formed by the plurality of terminals 106*a*,106*b*,108, and an overmolded portion 46 that extends over the plurality of terminals 106*a*, 106*b*,108 within the housing 32. In some embodiments, the terminal ends 106*a*, 106*b*,108 extend toward the PCB 72 in an inclined degree as shown in inclined section 44. In some embodiments, the first end of one or more of the signal terminals 106*a*, 106*b* is soldered to a cable conductor 58.

An alternate exemplary connector 30 may comprise a housing 32, a cover 34 extending over the housing 32 to define an interior region 36 therebetween, and at least one terminal assembly 42 located within the interior region 36, the terminal assembly 42 comprising a metal terminal portion that extends from a cable support region to a plurality of terminals 106*a*, 106*b*,108, and a overmolded portion 46 that is overmolded across the terminals 106*a*, 106*b*,108, wherein the overmolded portion 46 is affixed within the interior region 36 of the connector 30, wherein the terminals 106*a*, 106*b*,108 further define an inclined section 44 that extends downward toward a terminal connection 48 portion that extends below the mating surface 38 of housing 32, before the connector 30 is set on the PCB 72, and wherein the cover 34 is affixable to the PCB 72, to provide a compressive force between the connection portion 48 of the terminals 106*a*,106*b*,108 and corresponding electrically conductive contacts (e.g., gold fingers, pads, traces, etc.) on the PCB 72.

The connector 30 provides several advantages over existing connectors. For instance, the connector 30 can be smaller and easier to install, service, and or replace than other connectors. During installation, biaxial cables 56 can readily be prepared 404 (FIG. 16) and affixed 408 (FIG. 16) to the supported first end 112*a* of the terminal assemblies 42, with cable signal leads 58 soldered or otherwise connected to signal terminals 106*a*,106*b*, and cable shielding connected to ground terminals 108. The terminal assemblies 42 can be attached 416 within the housing 32, and the housing can readily be positioned 418 on the PCB, at which point, the cover can be installed 420, and affixed 422 to the PCB 72, completing the assembly in situ. As the terminals 106*a*, 106*b*,108 extend at an inclined angle as shown in inclined section 44 to contact tips 48, the terminals 106*a*, 106*b*,108 may provide wipe of the mating terminals on the PCB 72, which can remove oxide and other contaminates from the terminals, increasing the reliability of the interconnections in operation. As well, the connectors can readily be disassembled, inspected, and one or more of the components can be serviced or replaced if necessary, while minimizing potential damage to the PCB 72.

Figure 6:
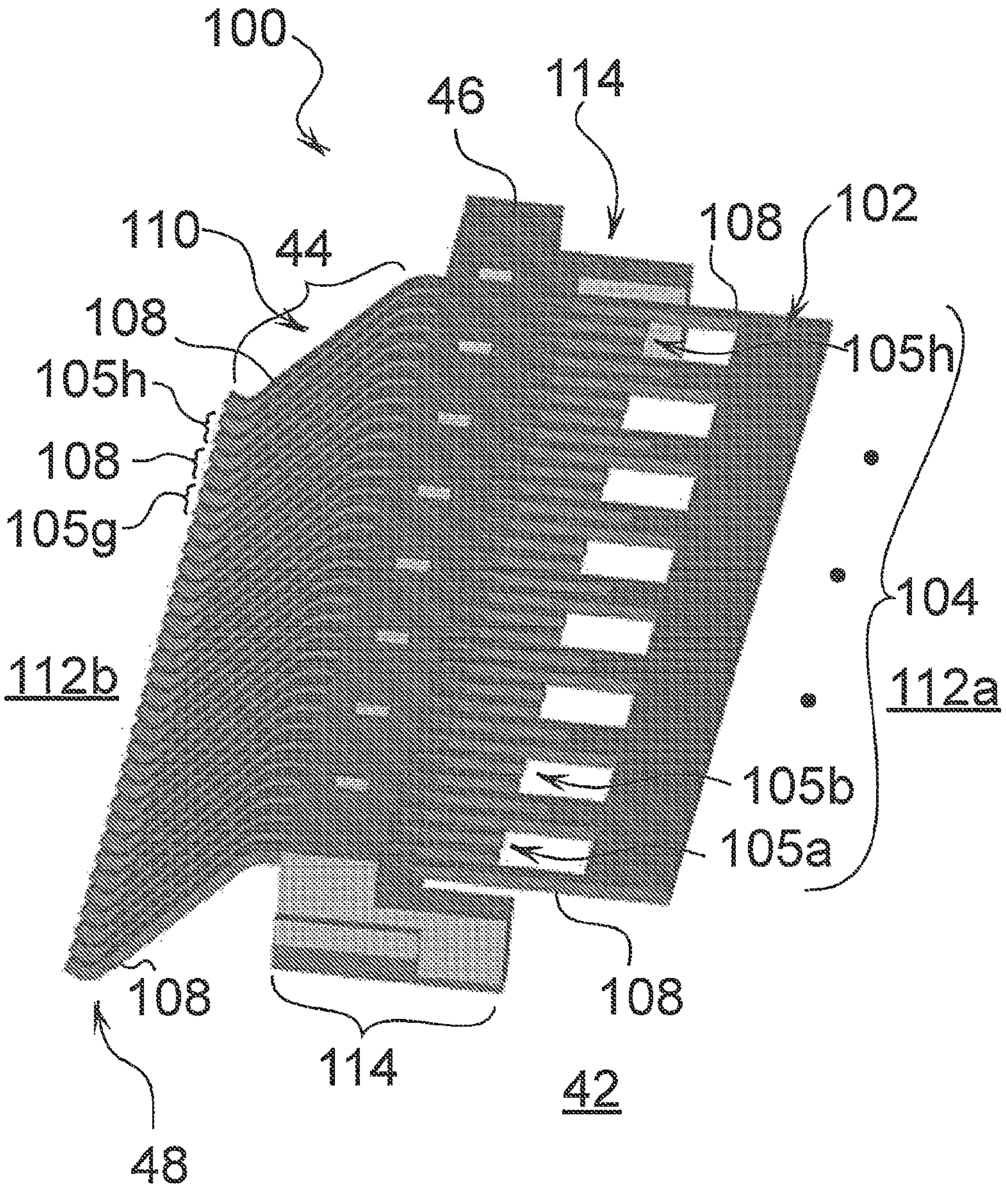
FIG. 6 is a detailed view of an exemplary embodiment of a terminal assembly that includes an integral ground terminal strip supporting portion.
Figure 7:
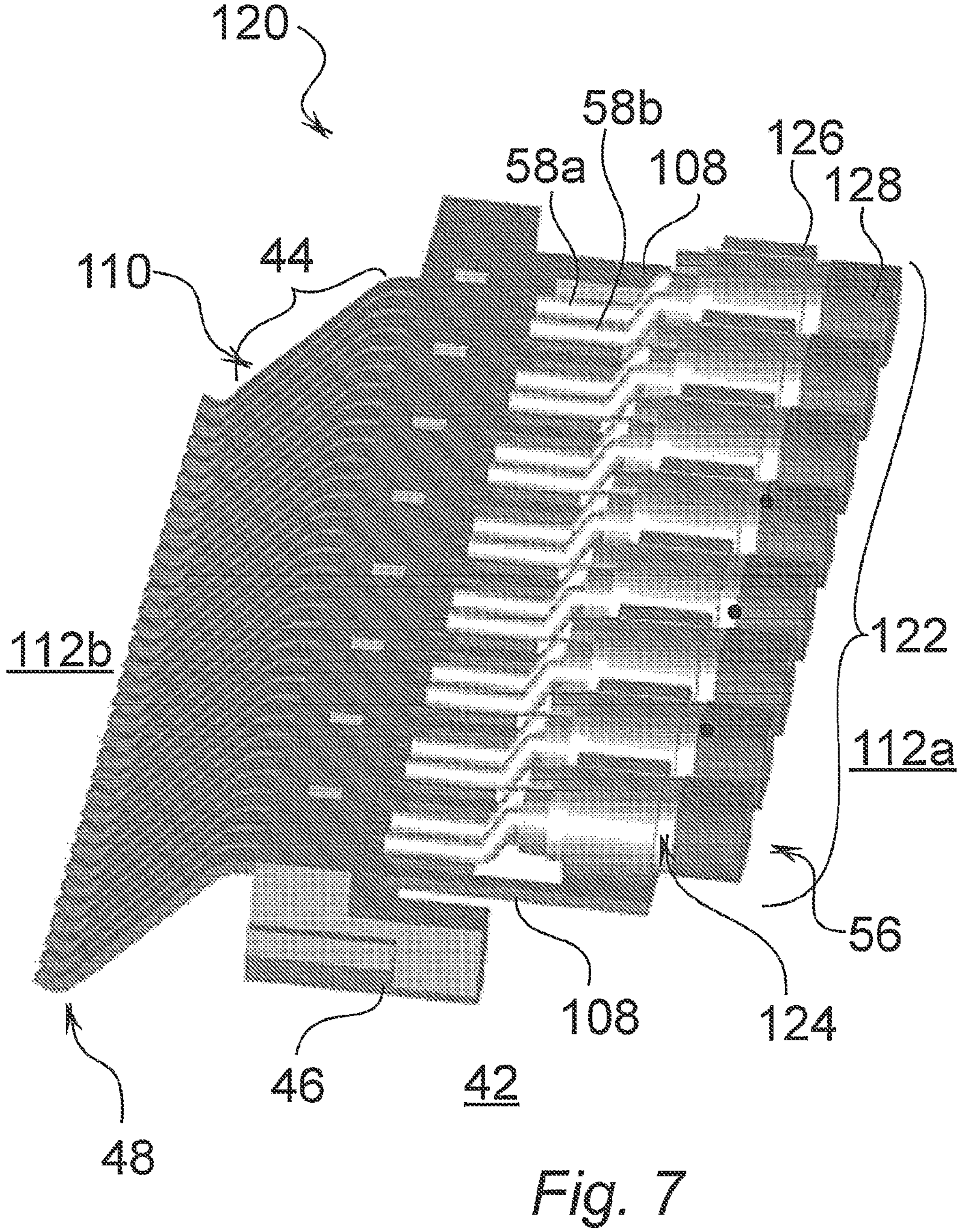
FIG. 7 is a detailed view of cables connected to an exemplary embodiment of a terminal assembly that includes an integral ground terminal strip supporting portion.

FIG. 6 is a detailed view 100 of an exemplary embodiment of a terminal assembly 42 that includes an integral ground terminal supporting portion 102. FIG. 7 is a detailed view 120 of a group 122 of cables 56, e.g., biaxial cables 56, connected to an exemplary embodiment of a terminal assembly 42 that includes an integral ground terminal supporting portion 102.

In the past, connectors were soldered onto mating terminals on a PCB, and then connected to another connector, PCB, or card on the end opposite the soldered connections. However, the resultant speed of such connectors was limited to be slower than high speed cables. As well, in the past, high speed connectors required a ground element to provide a ground function, which increased the complexity and cost of the assembly, and also increased the cost to service such an assembly.

Figure 8:
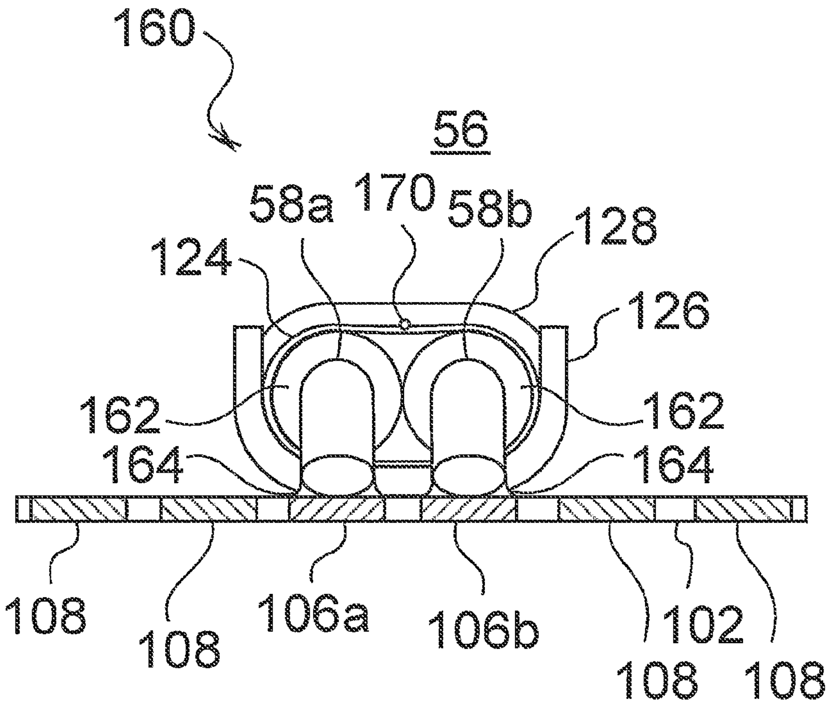
FIG. 8 is a detailed partial cutaway view of a cable connector terminal assembly, showing the arrangement and connection of one of the twinax cables with respect to signal connections and ground connections.

The terminal assembly 42 seen in FIG. 6 and FIG. 7 comprises an electrically conductive terminal assembly 110 that includes a ground terminal supporting portion 102 at a first end 112*a*, and a plurality of terminals 106*a*,106*b*, 108 that extend from the first end 112*a* toward a second end 112*b* opposite the first end 112*b*, such as extending downward through an inclined section 44. The terminal assembly 42 seen in FIG. 6 and FIG. 7 also includes an overmolded portion 46 that extends over the plurality of terminals 106*a*,106*b*,108 within a region located between the ground terminal supporting portion 102 at the first end 112*a* and contact tips 48 of the terminals 106*a*,106*b*,108 at the second end 112*b*. As also seen in FIG. 6 and FIG. 7, for a portion of the plurality of terminals, such as for signal terminals 106*a*,106*b*, in a region located between the overmolded portion and the first end 112*a*, connections between the terminals 106*a*, 106*b* and each of the other of the plurality of electrically connected terminals 106*a*,106*b*,108 are severed, creating signal terminal pairs 105, e.g., 105*a*-105*h*, each pair 105 having conductors 106*a* and 106*b* (FIG. 8). According to some embodiments, the plurality of terminals are disposed in alternating signal pairs and ground pairs.

The overmolded portion 46 seen in FIG. 6 and FIG. 7 can include mounting tabs 114 on opposing lateral sides, such as for mounting to mating features on a base housing 32 (FIG. 2, FIG. 3, FIG. 5), or within a base housing 202 (FIGS. 9-13A).

The terminal assembly 42 seen in FIG. 6 and FIG. 7 can readily be assembled and used for establishing terminal connections with a PCB 72, such as to be used in conjunction with a connector 30, 200, or 340. For instance, as seen in FIG. 7, a plurality 122 of twinax cables 56 can be connected to the terminal assembly 42, such as with signal leads 58, e.g., 58*a*, 58*b*, soldered or welded 164 (FIG. 8) to signal terminals 106*a*,106*b*, and with shield 124 electrically connected to the ground terminal supporting portion 102 that extends to ground terminals 108, either directly, or through the use of one or more cylindrical metal clips of clamp portion 126 (FIG. 7, FIG. 8).

FIG. 8 is a detailed partial cutaway view 160 of a cable connector terminal assembly, showing the arrangement and connection of one of the biaxial cables 56 with respect to signal terminals 106*a*, 106*b*, and ground connections 108. As seen in FIG. 8, electrically conductive signal leads 58, e.g., 58*a*,58*b*, can extend from corresponding dielectric 162 of a biaxial cable 56, to be soldered or welded 164 signal mating terminals 106, while the shield 124 of the biaxial cable 56 can be mechanically secured and electrically connected to a ground terminal supporting portion 102 of a terminal strip 100.

Twinax cable 56, such as seen in FIG. 7 and FIG. 8, is constructed to support transmission of a differential signal and has a balanced pair of signal wires 58*a*, 58*b* embedded in dielectric 162, which is encircled by a conductive layer 124. The shield 124 is usually formed using foil, such as aluminized biaxially-oriented PET (BoPET, such as MYLAR™. The biaxial cable 56 can also have a drain wire 170 (FIG. 8). Unlike a signal wire 58, which is generally surrounded by dielectric 162, the drain wire 170 may be uncoated so that it contacts the shield 124 at multiple points over the length of the cable 56. At an end of the cable 56, where the cable 56 is to be terminated to the signal terminals 106*a*, 106*b* (FIG. 6), the protective jacket 128, dielectric 162 and the shield 124 may be removed, leaving portions of the signal wires 58, e.g., 58*a*,58*b* (FIG. 7, FIG. 8) and the drain wire 170 exposed at the end of the cable 56. These signal wires 58 may be attached to respective signal terminals 106*a*,106*b*. The signal wires 58 may be attached to signal terminals 106*a*, 106*b* serving as mating contacts in the terminal assembly 42. The shield 124 may be attached to the ground terminal supporting portion 102 in the terminating structure, where ground terminal supporting portion 102 is a ground conductor, either directly or through the drain wire 170, if present. In this way, any ground return path may be continued from the cable 56 to the terminal assembly 42.

The terminal assembly 42 seen in FIG. 6 and FIG. 7 can readily be assembled and used for establishing terminal connections to a PCB 72, such as to be used in conjunction with a connector 30, 200, or 340.

In some embodiments, a method of constructing a terminal strip assembly 42 includes stamping an electrically conductive terminal assembly 110 (FIG. 6, FIG. 7), wherein the terminal assembly 110 includes a ground terminal supporting portion 102 at a first end 112*a*, and a plurality of terminals 106*a*,106*b*,108 extending from the ground terminal supporting portion 102 at the first end 112*a*, through an inclined region 44, toward a second end 112*b* opposite the first end 112*a*, in which contact tips 48 are defined. The method also includes overmolding portions of the plurality of terminals 106*a*, 106*b*, 108 with an overmolded portion 46 within a region located between the first end 112*a* and the second end 112*b*, and for a portion of the plurality of terminals, in a region located between the overmolded portion 46 and the first end 112*b*, severing a connection between the selected terminals to form signal terminals 106*a*, 106*b* and each of the other of the plurality of electrically connected terminals such as 108. In some embodiments, the ground terminal supporting portion 102 may be used to support one or more cables. In some embodiments, the supporting portion can be used as a ground element, such as to connect to outer shields of connected cables, e.g., twinax cables.

Figure 9:
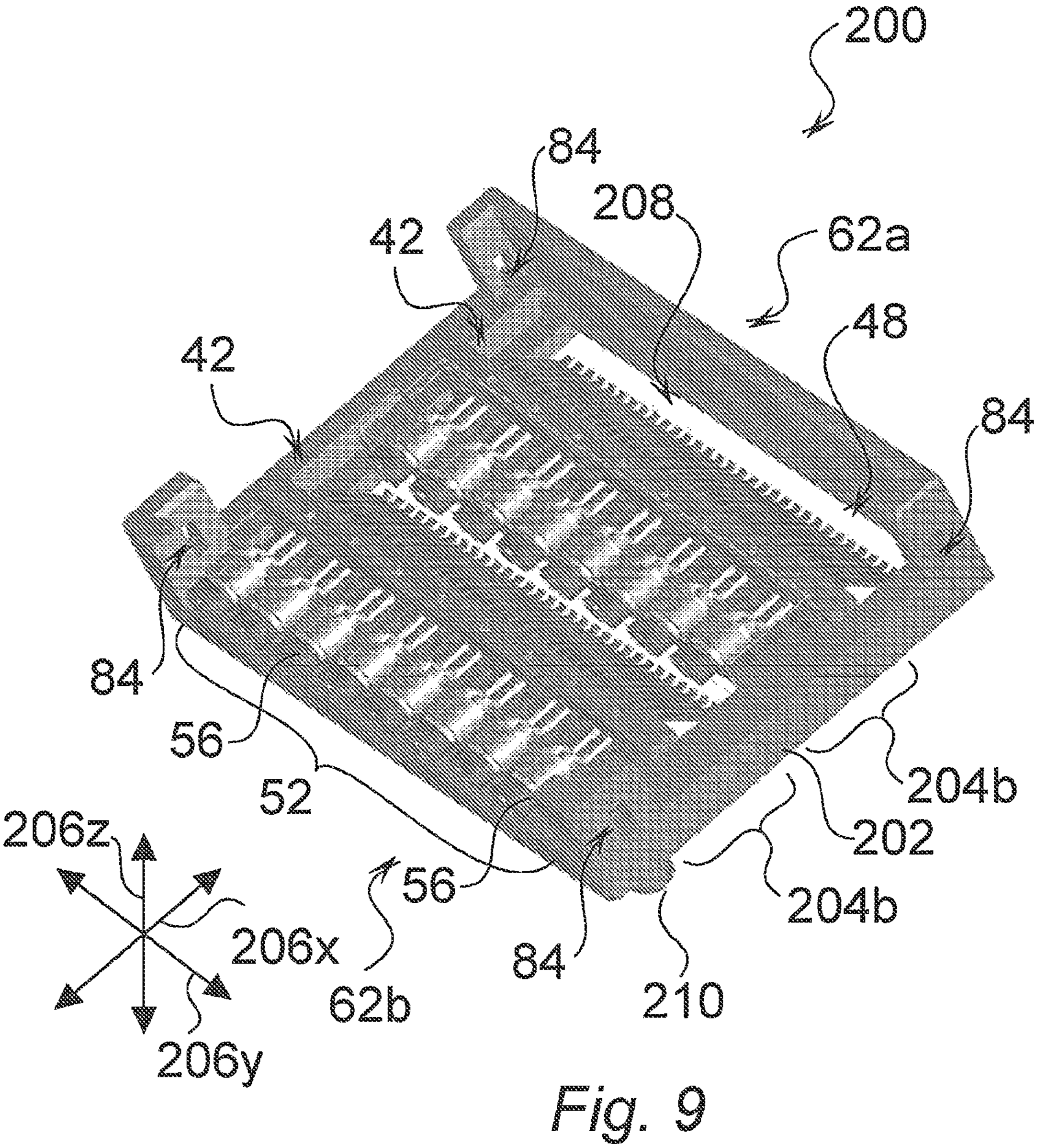
FIG. 9 is a partial detailed view of an exemplary embodiment of a high density wire to board (WTB) connector.
Figure 10:
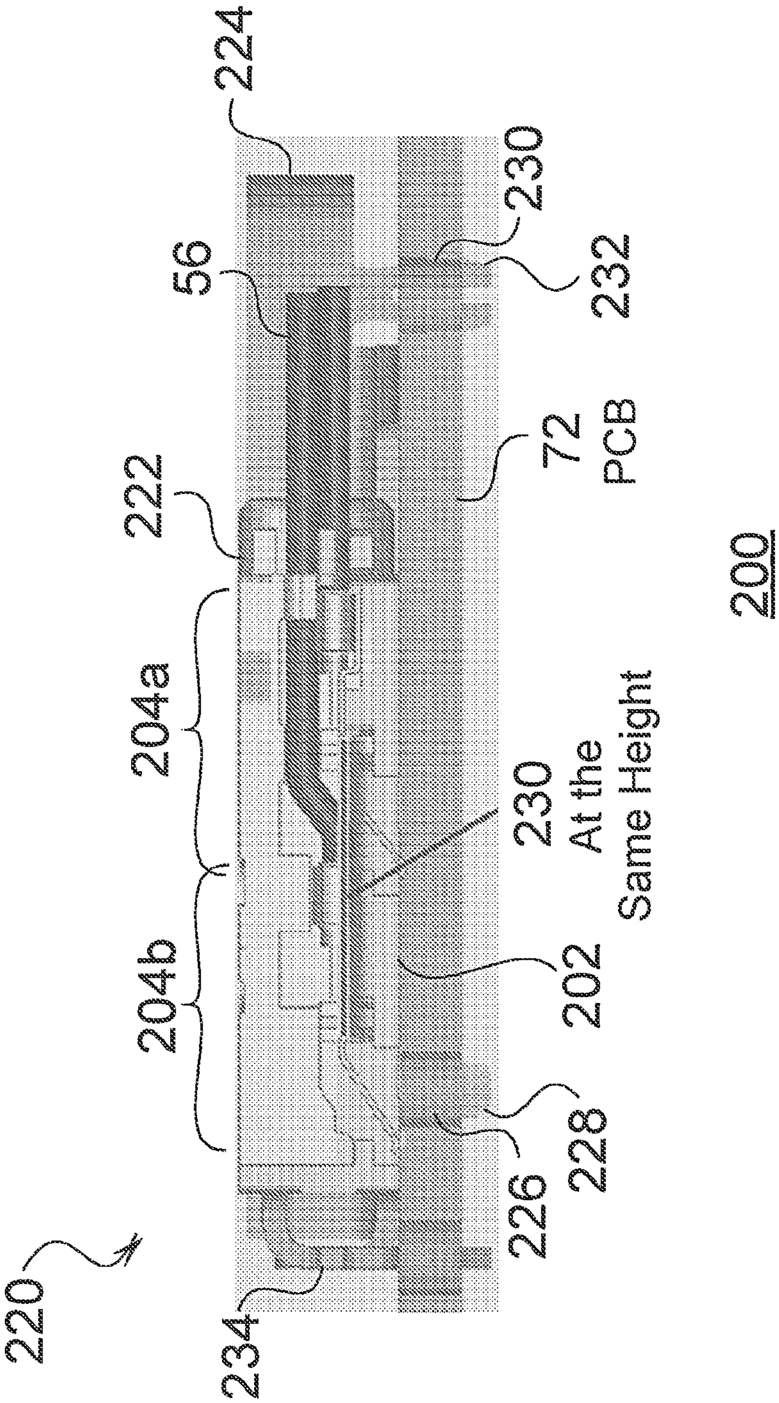
FIG. 10 is a side cutaway view of an exemplary embodiment of a high density wire to connector, as positioned and affixed to a PCB.
Figure 11:
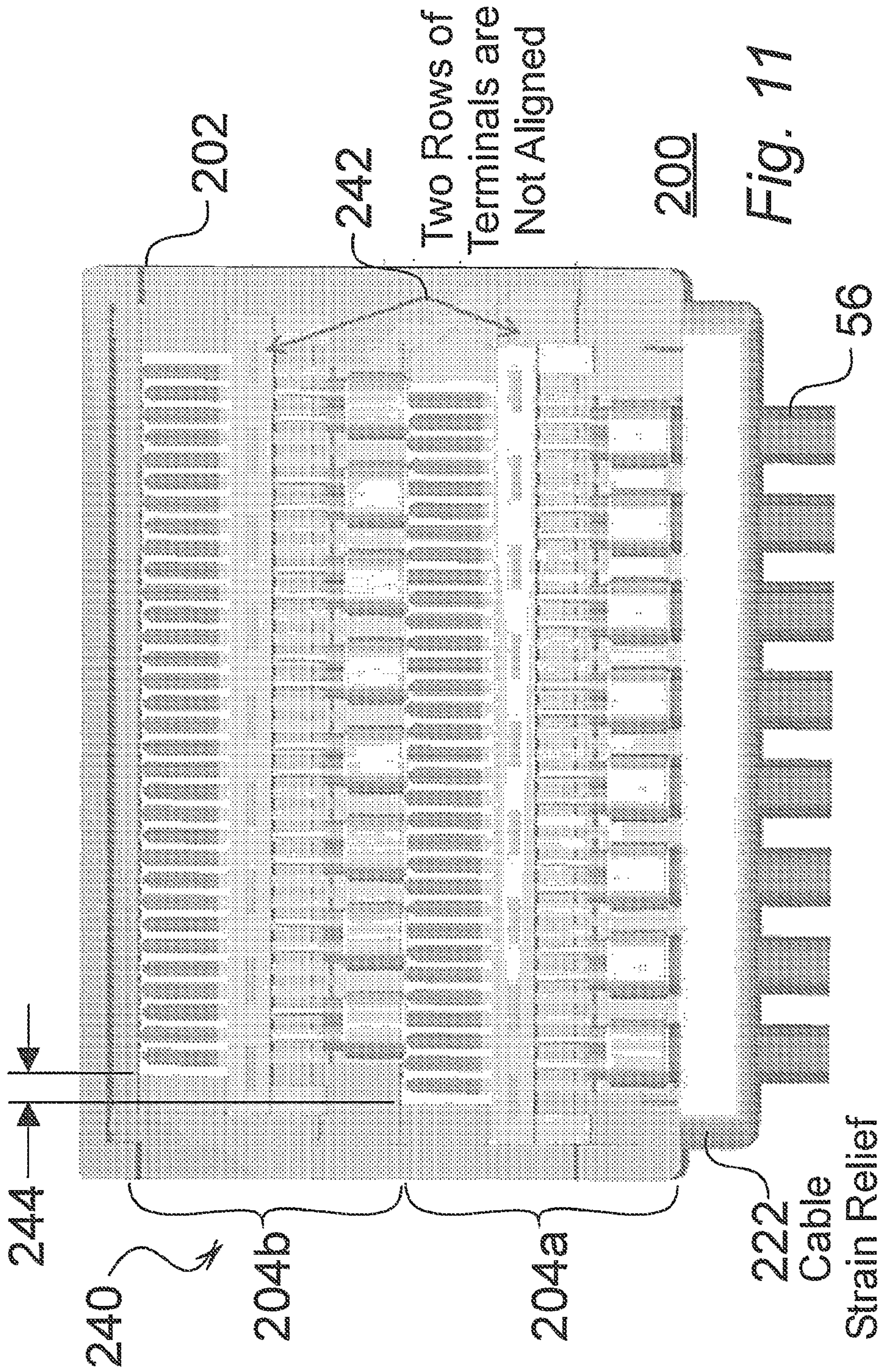
FIG. 11 is a top cutaway view of an exemplary embodiment of a high density wire to connector, which includes transversely staggered terminal assemblies mounted within a base housing.

FIG. 9 is a partial detailed view of an exemplary embodiment of a high density wire to board (WTB) connector housing 202 for a WTB connector 200. FIG. 10 is a side cutaway view 220 of an exemplary embodiment of a high density WTB connector 200, as positioned and affixed to a PCB 72. FIG. 11 is a top cutaway view 240 of an exemplary embodiment of a high density WTB connector 200, which includes transversely staggered terminal assemblies 42 mounted within a housing 202.

As seen in FIG. 9 and FIG. 10, terminal assemblies 42 may be positioned within a WTB housing 202 to define sequential rows e.g., 204*a*, 204*b*, such as along an X-axis 206*x*, to provide a high density arrangement.

In order to meet the market requirements of miniaturized and high-speed, the high density WTB connector 200 can be used to increase the number of terminals 106*a*, 106*b*,108 to increase speed, and can use a high density arrangement to meet the requirements of miniaturization.

In the past, high density wire-end connectors have been used. In order to prevent the wires affecting each other, such connectors often used a laminated design. However, such laminated designs can result in excessive length or height. Under such conditions, when wire connectors are used in an external port, the excessive length or height of the connector and wires can require too much space within a device.

As seen in FIG. 9, the terminal assemblies 42 include contact tips 48 which may protrude through a terminal access region 208, below the mating surface 38 (FIG. 2) of the high density WTB connector 200. As also seen, the housing 202 may include one or more bosses 210 that extend below the mating surface 38 of the housing 202, such as for positioning the housing on a surface 74*a* of a PCB 2. As seen in FIG. 10, the terminal assemblies 42 positioned in rows 204*a* and 204*b* may be positioned at the same vertical height, such as with respect to Z-axis 206*z* (FIG. 9). In some embodiments, such an arrangement may allow the terminal assemblies 42 to be identical. As also seen in FIG. 10, the fore and aft positioning of the rows 204*a* and 204*b* allows the connected cables 56 to be arranged with a high density. For instance, the first row 204*a* seen in FIG. 10 allows connected cables 56 to extend generally horizontally way from the first terminal assembly 42, e.g., along X-axis 206*x*, while the cables 56 connected to the second row 204*b* may extend up and over the cables 56 connected to the second row 204*b*, e.g., with respect to Z-axis 206*z*, thus yielding a high density connection.

As seen in FIG. 11, the fore and aft rows 204*a* and 204*b* may be laterally offset 244, e.g., with respect to Y-axis 206*y* (FIG. 9), such as to maximize the packing factor between the cables 56 associated with the first row 204*a* and the cables 56 associated with the second row 204*b*. This staggered arrangement 242 may also be used to provide a staggered arrangement between the contact tips 48 of the terminals and the mating terminals on the PCB 72, such as based on the layout and density requirements of the PCB 72.

Figure 12:
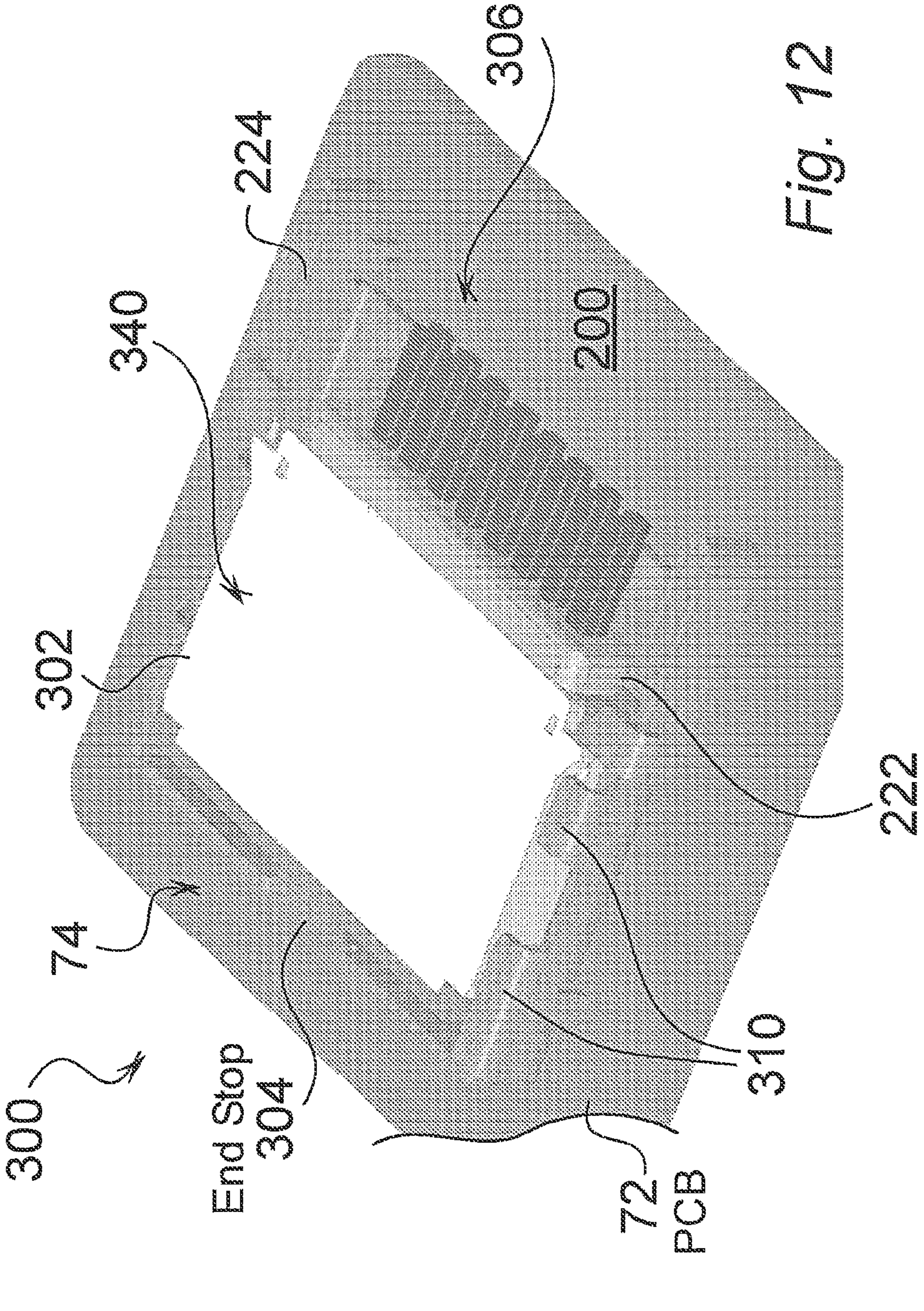
FIG. 12 is a detailed view of an exemplary embodiment of a slide frame assembly for installing high density connector on a PCB.

As seen in FIG. 10 and FIG. 11, the high density wire to board connector 200 may also include a strain relief 222, such as to accurately and securely hold the cables 56 to the WTB housing 202. The high density wire to board connector 200 also typically includes a cover 302 (FIG. 12). While some embodiments of the WTB connector may be affixed directly to a PCB 72, some embodiments can be retained by a frame 224, such as shown in FIG. 10.

In an embodiment, an exemplary high density wire to board (WTB) connector 200 may include a base housing 202 having a terminal access region 208 defined through a mating surface 38, and at least two terminal assemblies 42 arranged generally axially, i.e., in fore and aft rows 204, within the base housing 202, such that the terminals 106*a*, 106*b*,108 extend through the terminal access region 208, such as for connection to mating terminals on a PCB 72, and such that the rows 204*a*,204*b* of terminals 106*a*,106*b*,108 are at the same height in the housing. The terminal assemblies 42 can also provide solder wire terminals 164 (FIG. 8) for connected signal conductors 58, e.g., 58*a*, 58*b*.

An alternate WTB connector 200 may include a base housing 202 having a terminal access region 208 defined through a lower surface, and at least two terminal assemblies 42 having solder wire terminals that are arranged in fore and aft rows 204 with the base housing 202, such that terminals 106*a*,106*b*,108 extend from the terminal assemblies and through the terminal access region 208, and at least two terminal assemblies 42 having solder wire terminals arranged in fore and aft rows 204 within the base housing 202, wherein the rows 204 are arranged at the same height 230 in the housing. In some embodiments, the terminals 106*a*,106*b*,108 may extend through the terminal access region 208 for connection to mating terminals on a printed circuit board (PCB) 72. In some embodiments, there is no ground terminal supporting portion 102 (FIG. 6) connected to the solder wire terminals. In some embodiments, the rows of terminals 106*a*,106*b*,108 are laterally staggered with respect to each other. In some embodiments, cables 56 connected to the one of the rows 204*b* pass over the cables 56 of the other of the rows 204*a*. In some embodiments, the terminal assemblies 42 are laterally staggered 244 with respect to each other. In some embodiments, cables 56 connected to the first row 204*a* and cables 56 connected to the second row 204*b* extend from the same end of the housing 202, e.g., through a cable access hole 52 defined through the rear end 62*b*. In some embodiments, such as to meet the requirements of high-speed transmission, the height and length of the terminal assemblies 42 can be controlled at the same time.

In some embodiments, a method of connecting signal leads 58 and shield 124 from cables 56 to a PCB 72 using a WTB connector 200 comprises preparing 404 (FIG. 16) the cables 56 for connecting to a plurality of terminal assemblies 42, wherein the preparing 404 comprises removing a portion of a shield 128 from the cables 56, cutting or trimming a portion of the shield 128 and drain wire 170, and removing a portion of the dielectric 162 surrounding the conductors 58 of the cables 56, connecting the prepared cables 56 to the terminal assemblies 42, wherein the connecting 408 (FIG. 16) comprises soldering or welding 410 the signal leads 58 onto respective signal terminals 108 for each of the cables 56, and securing the cables 56 to the terminal assemblies 42 at the first end, either directly, or by a clamp portion 126, to connect any of the shield 128 or a drain wire 170 for each of the cables 56 to a ground terminal supporting portion 102, wherein ground terminals 108 extend from the ground terminal supporting portion 102 to the second end of the terminal assemblies 42, mounting or affixing 416 the finished terminal assemblies 42 within a base housing 202, wherein the terminal assemblies 42 axially arranged in fore and aft rows 204 within the base housing 202, wherein the rows 204 are arranged at the same height within the base housing 202, positioning the base housing 202 onto a mating surface of the PCB 72, and positioning a cover on the base housing 202. For example, the ground terminal supporting portion 102 may comprise one or more portions extending from a side of the ground supporting terminal portion 102. Each of the one or more may split into ground terminals 108 (e.g., split into 2 two ground terminals, e.g., a ground pair, separated by a space). The ground terminal supporting portion 102 may be wide enough to provide a surface onto which the clamp portion 126 may be welded or mounted, such that the clamp portion 126 is electrically and/or mechanically connected to the ground terminal supporting portion 102.

In some embodiments, the terminals 106*a*,106*b*, 108 extend through a terminal access region 208 for connection to mating terminals on the PCB 72. In some embodiments, the rows 204 of terminal assemblies 42 are laterally staggered 244 with respect to each other. In some embodiments, the cables 56 connected to one of the rows 204 pass over the cables 56 connected to the other of the rows 204. In some embodiments, the terminal assemblies 42 are laterally staggered 244 with respect to each other. In some embodiments, cables 56 connected to the first row 204*a* and cables 56 connected to the second row 204*b* extend from the same axial end 62*a* of the housing 202.

The market for small and high-speed connectors has necessitated a substantial increase in the number of terminals to increase speed, and the use of high density arrays, to meet the requirements of miniaturization. However, the limits of conventional connector technologies have not been able to keep up with the needs of these industries. As well, conventional approaches have not been able to substantially reduce the height of such connectors and associated cables.

In the past, most connectors and circuit boards were assembled by soldering terminals on circuit boards by Surface Mount Technology (SMT) connectors, Dual Inline Packaging (DIP) connectors, or press-fit connectors. However, as the number of required terminals has increased, the use of soldered terminals has become problematic, not only for initial manufacture, but also because it is difficult to rework and replace soldered connections, if any defects occur.

Figure 13A:
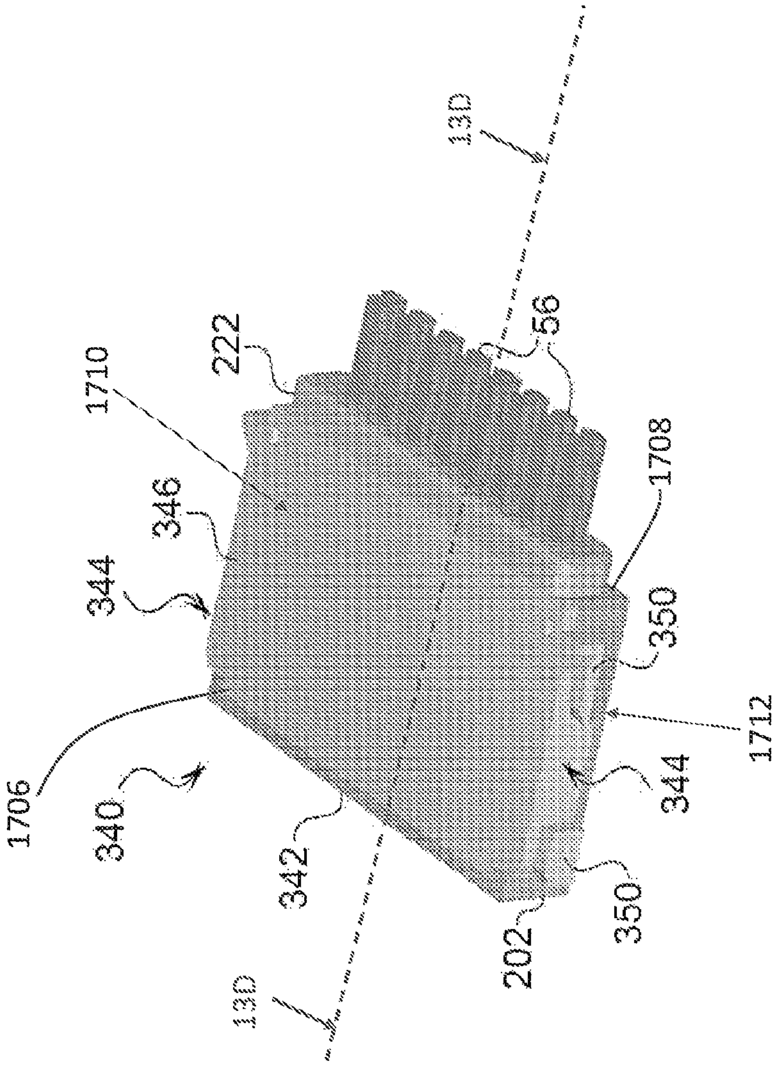
FIG. 13A is a top perspective view of an exemplary embodiment of a high density connector which can include integral locking portions by which the connector can be accurately positioned and affixed to a mating slide frame assembly, for mounting to a PCB.
Figure 13B:
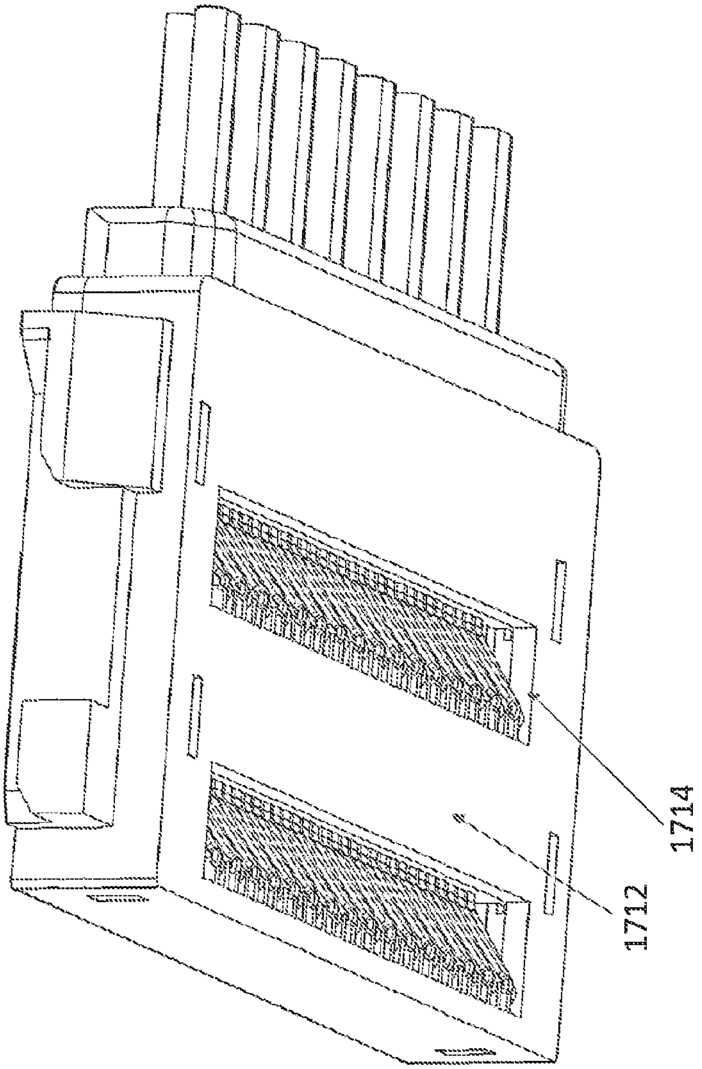
FIG. 13B is a bottom perspective view of the connector of FIG. 13A.
Figure 13C:
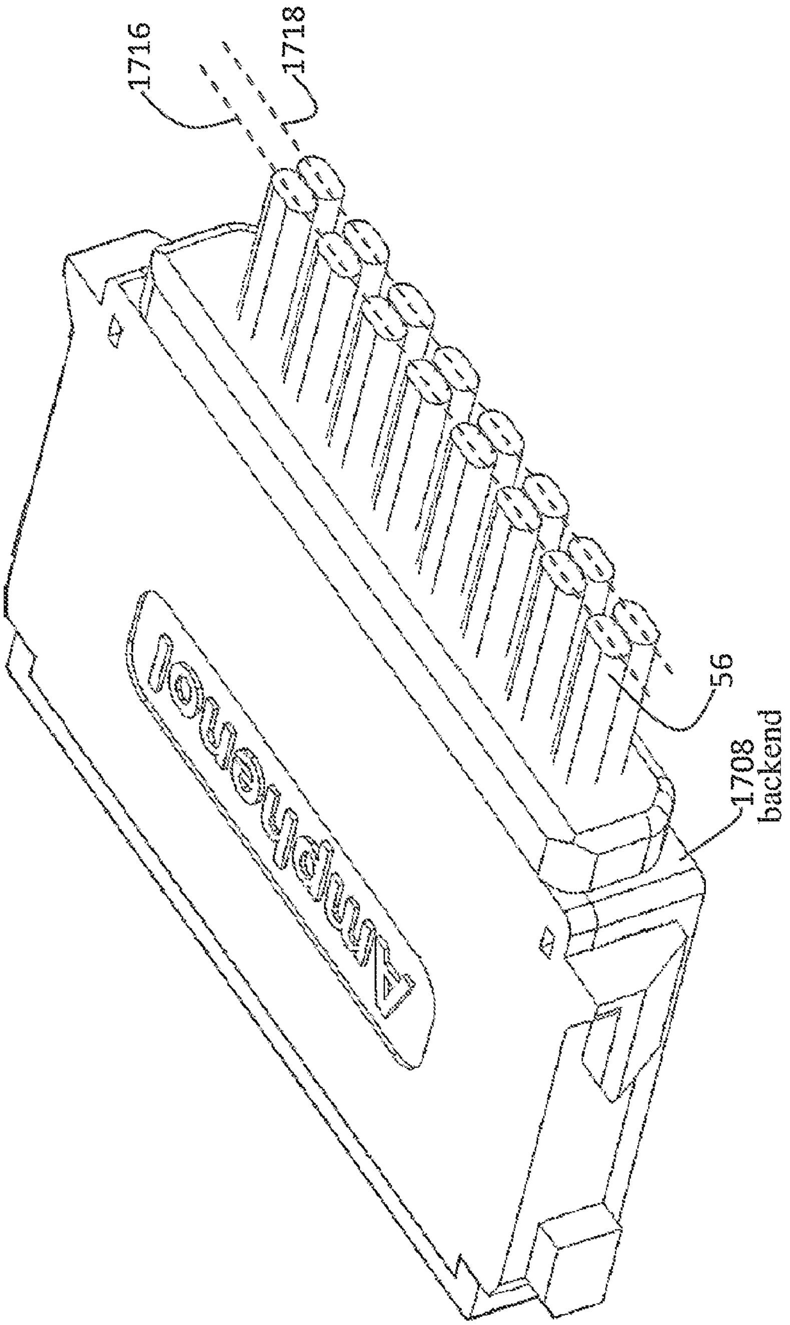
FIG. 13C is another top perspective view of the connector of FIG. 13A.
Figure 13D:
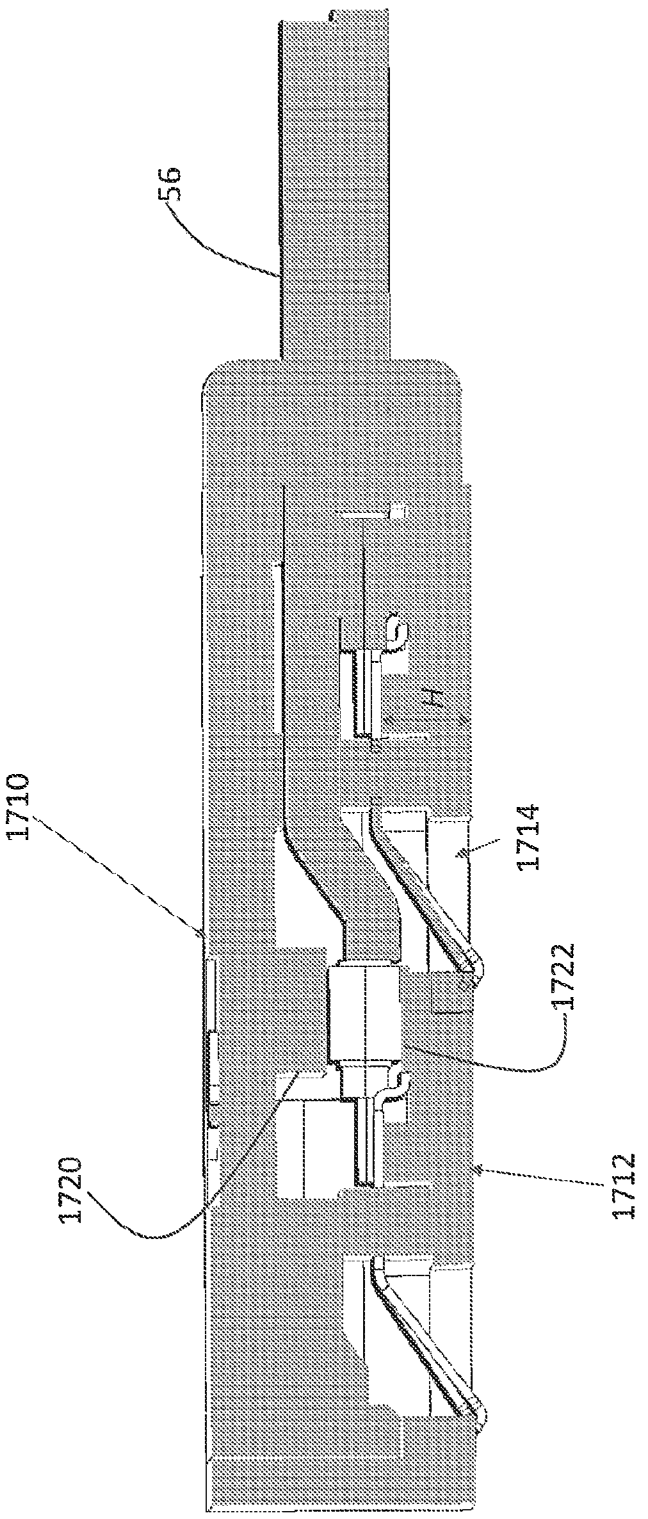
FIG. 13D is a cross-sectional view of the connector along the line marked "13D" in FIG. 13A.
Figure 13F:
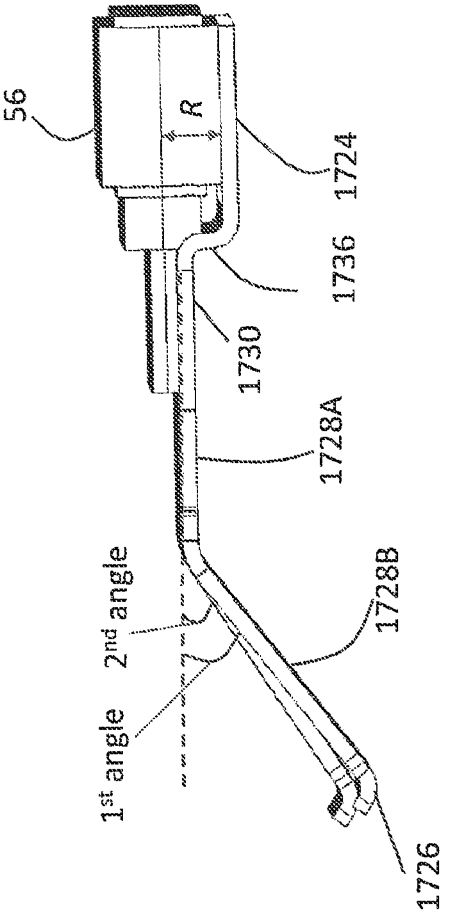
FIG. 13F is a side view of the row of terminals of FIG. 13E.
Figure 13E:
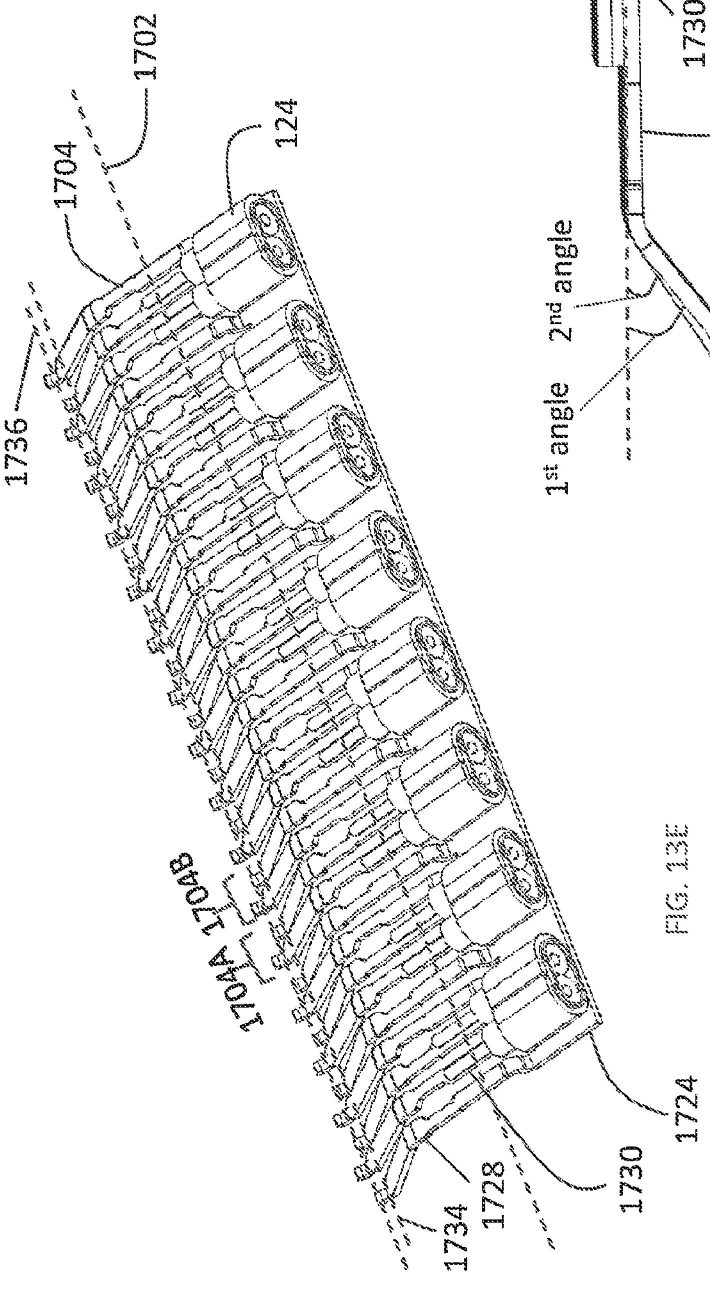
FIG. 13E is a perspective view of a row of terminals of the connector of FIG. 13A, with portions of cables attached to the terminals shown.

FIG. 13A is a top perspective view of an exemplary embodiment of a high density connector 340 that may include integral locking portions by which the connector can be accurately positioned and affixed to a mating frame 224, for mounting to a PCB 72. FIG. 13B is a bottom perspective view of the connector 340. FIG. 13C is another top perspective view of the connector 340. FIG. 13D is a cross-sectional view of the connector 340 along the line marked "13D" in FIG. 13A. FIG. 13E is a perspective view of a row 1702 of terminals 1704 of the connector 340, with portions of cables 56 attached to the terminals 1704 shown. FIG. 13F is a side view of the row 1702 of terminals 1704.

The connector 340 may include two or more rows of terminals held by a housing 1706. The housing may include a cover 346 and a base housing 202. The housing may include a bottom surface 1712 configured to face a PCB and a top surface 1710 opposite the bottom surface 1712. The terminals 1704 may each include a first contact portion 1726, a second contact portion 1730 opposite the first contact portion 1726, and an intermediate portion 1728 extending between the first contact portion 1726 and the second contact portion 1730. The first contact portions 1726 may be configured to mount to the PCB. The second contact portions 1730 may be configured to connect with cables 56. The second contact portions 1730 of the two or more rows 1702 of terminals 1704 may have a same height H with respect to the bottom surface 1712 of the housing 1706. As illustrated, the cables may extend from a same backend 1708 of the housing 1706. In some embodiments, jackets of at least some of the cables 56 may be adjacent to each other. In the illustrated example, the cables 56 are disposed in two rows 1716 and 1718, each connecting to a corresponding row 1702 of terminals 1704. The cables in the row 1716 are adjacent to respective cables in the row 1718.

In some embodiments, the housing may include one or more openings 1714 at the bottom surface. The first contact portions 1726 of the terminals may extend through a respective opening 1714 at the bottom surface 1712 of the housing 1706, and curve away from the bottom surface 1712 of the housing 1706. The intermediate portion 1728 of the terminals 1704 may include a first portion 1728A extending substantially parallel to the bottom surface 1712 of the housing 1706 and a second portion 1728B extending in an angle relative to the first portion 1728A. The angle may be in the range of 0 to 90 degrees including any number in between. The angle may change when the first contact portion 1726 mounted onto the surface of the PCB.

In some embodiments, the connector 324 may include an integrally formed shield mechanism, which provides consistent shielding at connection areas where the cables are mounted to the second contact portions of the terminals and therefore improves signal transmission performance. The shield mechanism may also aid in terminating cables to the cable connector by facilitating mechanical connection of the cable to the terminals of the connector as well as forming electrical connections between cable shields and terminals serving as grounds within the connector.

In some embodiments, for each row 1702, the shield mechanism may include ground terminals 1704B in the row and a strip 1724 connecting the second contact portions 1730 of the ground terminals 1704B in the row 1702. In some embodiments, the shield mechanism may include one or more shield members (not shown) that at least partially surround respective cable shields. The one or more shield members may connect the cable shields 124 to the strip 1724, and may include holding mechanisms for enhancing the forces applied to the cable shields 124. In some embodiments, the second contact portions 1730 of the ground terminals 1704B may bend downward by, for example, the radius R of the cable, such that the signal conductors 58*a*, 58*b* of the cables are aligns with the second contact portions 1730 of the signal terminals 1704A and the strip 1724 aligns with the cable shields 124. Such a configuration avoids jogging signal conductors 58*a*, 58*b* of the cables adjacent the connection areas and therefore improves signal integrity by increasing the consistency of the transmission path.

In some embodiments, for each row, the second portions 1728B of the intermediate portions 1728 of the terminals 1704 may be disposed in first and second sub-rows 1734, 1736 in an alternative fashion. The second portions 1728B of the intermediate portions 1728 of the terminals 1704 in the first sub-row 1734 extend in a first angle relative to respective first portions 1728A of the intermediate portions 1728. The second portions 1728B of the intermediate portions 1728 of the terminals 1704 in the second sub-row 1736 extend in a second angle relative to respective first portions 1728A of the intermediate portions 1728. The second angle is different from the first angle. Such a configuration increases distances between the first contact portions of adjacent terminals and therefore enables disposing the terminals more tightly together.

In some embodiments, for each row, the terminals may be disposed in signal pairs 1704A separated by ground pairs 1704B. Such a configuration enables a wider ground for better shielding and the same beam properties for the terminals in a row at the same time.

Figure 14:
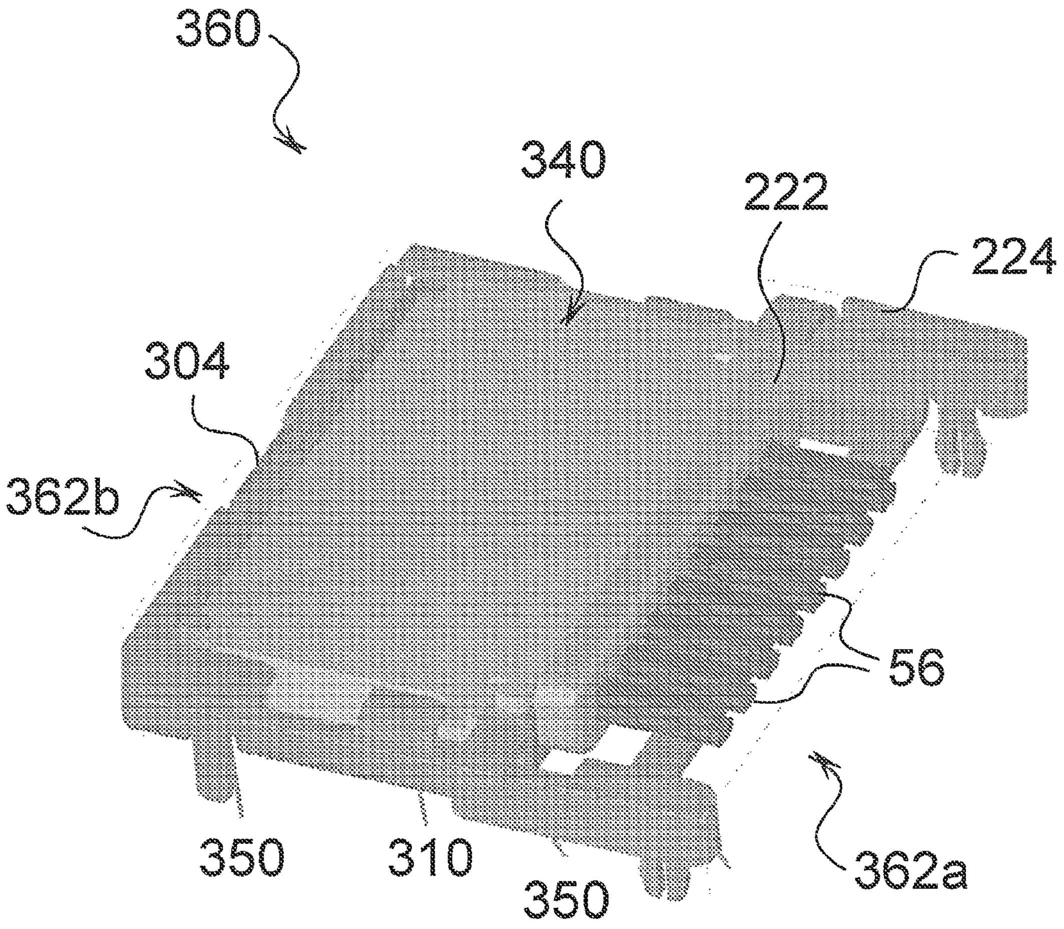
FIG. 14 is a detailed perspective view of an exemplary embodiment of a high density connector that is positioned and affixed to a mating slide frame assembly, for mounting to a PCB.

FIG. 12 is a detailed view of an exemplary embodiment of a slide frame assembly 300 that can include a frame 224 for installing a high density connector, e.g., 340 (FIG. 13A) on a PCB 72. FIG. 14 is a detailed perspective view of an exemplary embodiment of the high density connector 340 that is positioned and affixed to a frame 224, for mounting to a PCB 72.

Figure 15:
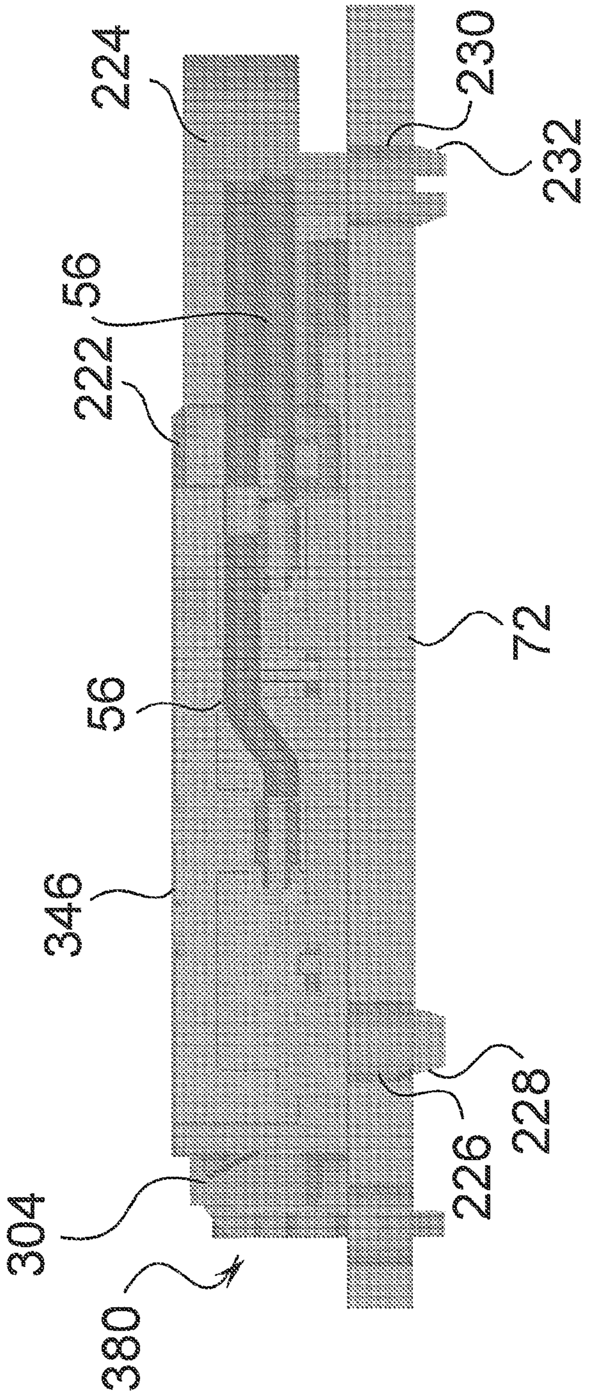
FIG. 15 is a detailed partial cutaway side view of an exemplary embodiment of a high density connector that is positioned and affixed to a mating slide frame assembly, which is positioned and affixed to a PCB.

FIG. 15 is a detailed partial cutaway side view 380 of an exemplary embodiment of the high density connector 340 that is positioned and affixed to frame 224, which is positioned and affixed to a PCB 72.

As seen in FIG. 12, a frame 224 may be mounted to a surface 74 of a PCB 72. The frame 224 seen in FIG. 12 may include an associated elastic lock portion 310, whereby a high density connector 340 may be configured to be slidably installed in the frame 224 and retained by the elastic lock portion 310. For instance, a user can use an axial sliding movement to install the connector 340 onto the frame 224, wherein the elastic lock portion 310 affixed to the frame 224 is engaged with the locking parts 350 (FIG. 13A) of the cover 346 of the connector 340, such that the terminals 106*a*,106*b*,108 extending from the mating surface 38 of the connector 340 can electrically contact mating terminals on the circuit board 72. In some embodiments, the frame 224 is electrically isolated from the circuit board 72 and/or the connector 340. In some embodiments, the frame 224 is a separate component and is affixed to the circuit board 72. In some embodiments, both lateral sides 344 (FIG. 13A) of the frame 224 include first and second locking parts 310 that correspond with the first and second locking parts 350 (FIG. 13A) on the cover 346 of the connector 340. In some embodiments, the frame 224 is comprised of a single metal part, while in other embodiments the frame 224 includes two pieces. In some embodiments, the locked part of the frame 224 is made by folding back at least a portion of the rear end 304 of the frame 224. In some embodiments, the locking part 310 of the frame 224 is formed by recessing the frame 224 laterally inward on one or both sides. In some embodiments, the frame 224 includes a stop portion 304. The high density connector 340, in conjunction with a frame 224, can be used to reduce the overall height of the connection interface, while simultaneously meeting the requirements of high-speed signal transmission.

In an embodiment, a frame assembly 300 for connection to a connector 340 having terminals extending below a base housing 32,202 and having locking parts 350 comprises: a frame 224 that is affixable to a surface 74 of a PCB 72, and an elastic lock portion 310 affixed to the frame 224 such that, when the frame 224 that is affixed to the surface 74 of the PCB 72, the connector 340 can slide axially into the frame 224 so that the locking parts 350 on the connector 340 can be engaged with the elastic lock portion 310, and so that the terminals can contact mating terminals on the PCB 72. In some embodiments, the frame assembly 300 is electrically isolated from both the PCB 72 and the connector 340. In some embodiments, the frame 224 is a separate component, and is affixed to the PCB. In some embodiments, both lateral sides 344 of the connector 340 include locking parts 350, which correspond to lock portions on the slide frame assembly 300. In some embodiments, the frame 224 is comprised of a single integrated component. In some embodiments, the frame 224 is assembled from two metal parts. In some embodiments, the frame 224 includes an end stop 304, such as formed in the rear end of the frame 224, which may be used to limit the axial movement of the back wall of the connector 340 during installation of the connector 340. In some embodiments, each of the locking parts 350 of the frame are formed by recessing the lateral sides of the frame inward. In some embodiments the end stop 304 is located on the front, i.e., entry side of the frame 224, to limit the axial movement of the connector 340 during installation.

In some embodiments, a method of establishing electrical connections between a connector 30, 200, or 340 to a PCB 72, using a frame 224, comprises installing slide assembly 300 onto a mating surface 74 of the PCB, and then slidably installing the prepared connector, e.g., 340, including its cover, e.g., 346, into a locked position with respect to the the connector 340 i.e., wherein locking parts 350 on the connector 340 are engaged with matching lock portions 310 on the frame 224, so that the connector terminals make contact with mating terminals on the PCB 72.

As seen in FIGS. 9-15, some embodiments of the frame 224 can be used in conjunction with high speed connectors, such as 30, 200, and/or 340, such as to reduce the height of the connections, while concurrently meeting the requirements of high speed signal transmission.

Figure 16:
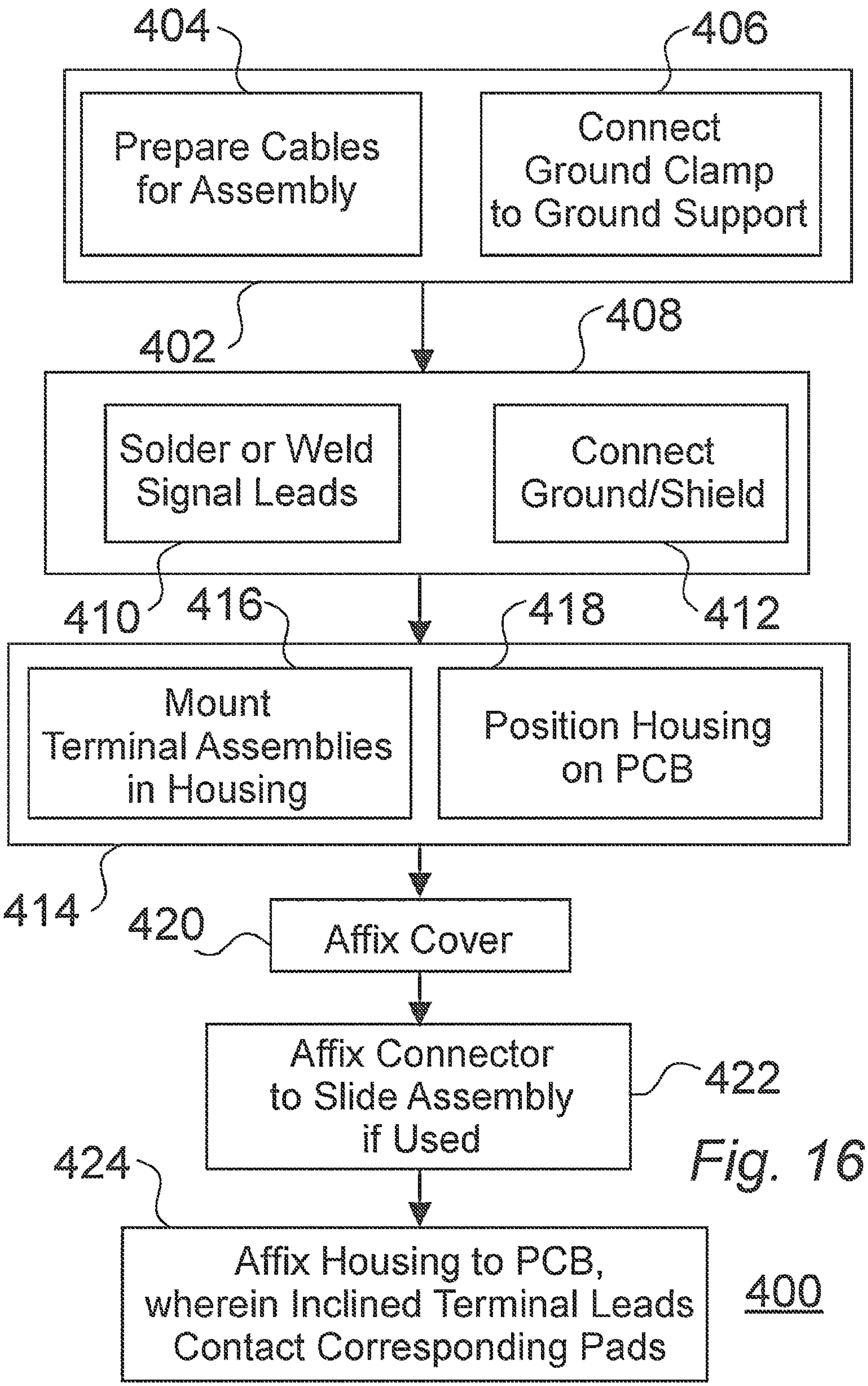
FIG. 16 is a flowchart of an exemplary method for connecting signal and ground leads to a PCB using a connector.

FIG. 16 is a flowchart of an exemplary method 400 for connecting signal and ground leads to a PCB using an exemplary connector, e.g., 30, 200, and/or 340. For instance, for the installation of a connector 30, initial terminal assembly preparation 402 can include preparing 404 cables 56 for connecting to the terminal assemblies 42. For example, twinax cables 56 may be prepared 404 by stripping or otherwise removing a portion of the shield 128 from the cables 56, cutting or trimming a portion of the shield 124 and drain wire 170 if necessary, and stripping or otherwise removing a portion of the dielectric 162 surrounding the conductors 58, e.g., 58*a*,58*b* of the cables 56 (FIG. 7, FIG. 8). The initial terminal assembly preparation 402 can also include connecting 406 a clamp portion 126 to a ground terminal supporting portion 102 of a terminal assembly 42, wherein the connection 406 may include any of a mechanical connection, a solder connection, or a weld. The method 400 seen in FIG. 16 subsequently includes connecting 408 the prepared cables 56 to the terminal assemblies 42. For instance, the connections 408 may include soldering or welding 164 the signal leads 58, e.g., 58*a*,58*b*, onto respective signal terminals e.g., 106*a*, 106*b*, for each of the cables 56. As well, the cables 56 may physically be secured to the terminal assembly 42 at the first end 112*a*, such as to the ground terminal supporting portion 102, either directly, or by means of clamp portion 126 which, as seen in FIG. 7 and FIG. 8, can be used to connect the shield 124 and/or the drain wire 170 for each of the cables 56 to the ground terminal supporting portion 102, and to the ground terminals 108 that extend from the ground terminal supporting portion 102 to the second end of the terminal assembly 42. During subsequent operations 414, the finished terminal assemblies 42 may be mounted or affixed 416 within the base housing 32, and the base housing 32 may be positioned 418 onto the mating surface 74 of the corresponding PCB 72, such as by inserting bosses 40 (FIG. 2) into holes 76 (FIG. 3). The cover 34 may then be attached 418 to the base housing 32, and for embodiments that do not include a slide assembly 224 (FIG. 12), the base housing 32 may be directly attached 422 to the PCB 72. In some embodiments, the base housing 32 acts to compress the contact tips 48 or the terminals *106a*,*106b*, 108 against mating terminals or contacts on the PCB 72. In embodiments that include a slide assembly 224, the cover 346 (FIG. 13A) may be installed before the connector 340 is locked into the slide assembly 224,310 (FIGS. 12-14).

The initial terminal assembly preparation 402 can also include connecting 406 a clamp portion 126 to a ground terminal supporting portion 102 of a terminal assembly 42, wherein the connection 406 may include any of a mechanical connection, a solder connection, or a weld.

Various changes may be made to the illustrative structures shown and described herein. Manufacturing techniques may also be varied. Furthermore, although many inventive aspects are shown and described with reference to a cable connector, it should be appreciated that aspects of the present disclosure is not limited in this regard, as any of the inventive concepts, whether alone or in combination with one or more other inventive concepts, may be used in other types of electrical connectors, such as right angle connectors, stacking connectors, I/O connectors, chip sockets, etc.

The present disclosure is not limited to the details of construction or the arrangements of components set forth in the foregoing description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. A pressure mount cable connector, comprising:

a housing comprising a face configured for mounting against a printed circuit board, with at least one opening through the face; and a plurality of terminal assemblies mounted in the housing, each of the plurality of terminal assemblies comprising a plurality of terminals, each of the plurality of terminals comprising a first contact portion and a second contact portion opposite the first contact portion, wherein:

the first contact portions of each of the plurality of terminals of the plurality of terminal assemblies are exposed in a row within a respective opening of the at least one openings and comprise electrically conductive contact tips configured for solderless connection to terminals on the printed circuit board, the second contact portions of the plurality of terminals of the plurality of terminal assemblies are configured for terminating a cable, and the plurality of terminal assemblies are mounted in the housing with the first contact portions of the plurality of terminals of the plurality of terminal assemblies forming an acute angle with respect to the face such that the first contact portions are configured to contact the printed circuit board through pressure applied by at least a portion of the housing.

2. The connector of claim 1, wherein:

the at least one opening comprises a plurality of openings; and the first contact portions of each of the plurality of terminals of the plurality of terminal assemblies are exposed in a row within a separate opening of the plurality of openings.

3. The connector of claim 1, wherein the face of the housing comprises a boss configured for entering an opening in the printed circuit board so as to align the connector with pads on a surface of the printed circuit board.

4. The connector of claim 1, wherein each of the plurality of terminal assemblies further comprises an over molded plastic portion that extends over the plurality of terminals of the terminal assembly.

5. The connector of claim 1, wherein:

the plurality of terminals are disposed in alternating signal pairs and grounds.

6. The connector of claim 5, wherein:

for each of the plurality of terminal assemblies, the second contact portions of the grounds extend beyond the second contact portions of the signal pairs and are joined by a strip.

7. The connector of claim 6, wherein, for each of the plurality of terminal assemblies:

the ground terminals are disposed in pairs; and ground terminals of the pairs extend from respective portions of the strip and split into separate members, each with a first contact portion of a ground terminal.

8. The connector of claim 6, wherein for each of the plurality of terminal assemblies:

intermediate portions of the ground terminals are in a plane with intermediate portions of the pairs of signal terminals;

second contact portions of the grounds are bent orthogonal to the plane such that the strip is parallel to and offset from the second contact portions of the terminals of the signal pairs.

9. The connector of claim 6, wherein each of the plurality of terminal assemblies further comprises:

a plurality of cables terminated to the second contact portions of the plurality of terminals of the terminal assembly; and a plurality of shield members adjacent the plurality of cables.

10. The connector of claim 9, wherein for each of the plurality of terminal assemblies:

cables of the plurality of cables have exposed cable shields; and a shield of the plurality of shields is welded to the strip and urges exposed cable shields of the plurality of cables against the strip.

11. The connector of claim 9, wherein cables of the plurality of terminal assemblies extend from the housing in a plurality of parallel rows.

12. The connector of claim 1, wherein:

each of the plurality of terminal assemblies comprises mounting tabs on opposing sides engaging the housing.

13. The connector of claim 1, wherein:

the housing has locking parts configured for engaging corresponding elastic locking parts of a frame mounted to the printed circuit board, the locking parts of the housing comprising a portion tapering outwards from the housing to a ledge, facing in a direction opposite the face of the housing.

14. The connector of claim 1, wherein:

in an uncompressed state, the first contact portions of the plurality of terminals of the plurality of terminal assemblies extend beyond the face such that, when the connector is pressed against the printed circuit board, the first contact portions wipe across the terminals on the printed circuit board.

15. A frame for connecting a pressure mount connector to a printed circuit board, the connector having locking parts on a housing, and terminals extending below a face of the housing, the frame comprising:

a first side wall and a second side wall with a space therebetween configured to receive the pressure mount connector; and at least one elastic lock portion on each of the first side wall and the second side wall, wherein the elastic lock portions extend into the space and are configured to engage locking parts on the connector housing.

16. The frame of claim 15, wherein the frame is a single integrated component.

17. The frame of claim 16, wherein the frame is formed from a single metal part.

18. The frame of claim 15 in combination with a pressure mount connector, the pressure mount connector comprising:

a housing comprising a face configured for mounting against the printed circuit board, with at least one opening through the face; and a plurality of terminal assemblies mounted in the housing, each of the plurality of terminal assemblies comprising a plurality of terminals, each of the plurality of terminals comprising a first contact portion and a second contact portion opposite the first contact portion, wherein:

the first contact portions of each of the plurality of terminals of the plurality of terminal assemblies are exposed in a row within a respective opening of the at least one openings and comprise electrically conductive contact tips configured for solderless connection to terminals on the printed circuit board, the second contact portions of the plurality of terminals of the plurality of terminal assemblies are configured for terminating a cable, and the plurality of terminal assemblies are mounted in the housing with the first contact portions of the plurality of terminals of the plurality of terminal assemblies forming an acute angle with respect to the face such that the first contact portions are configured to contact the printed circuit board through pressure applied by at least a portion of the housing.

19. The frame in combination with the pressure mount connector of claim 18, wherein the housing has locking parts comprising a portion tapering outwards from the housing to a ledge, facing in a direction opposite the face of the housing; and the elastic lock portions of the frame engage corresponding locking parts of the housing.

20. A method for establishing electrical connections between a connector and a printed circuit board using a frame, the method comprising:

installing a frame onto a mating surface of a printed circuit board, the printed circuit board comprising a plurality of pads, wherein the plurality of pads are exposed through an opening in the frame; and inserting into the frame a pressure mount connector with a face facing the surface of the printed circuit board, wherein the connector comprises a plurality of first contact portions extending beyond the face;

pressing the connector against the printed circuit board such that the first contact portions wipe across the pads on the printed circuit board; and engaging locking parts on the connector with matching lock portions on the frame to hold the connector against the printed circuit board.

21. The method of claim 20, wherein pressing the connector against the printed circuit board comprises aligning a plurality of bosses extending from the face of the connector with respective holes in the mating surface of the printed circuit board.

22. The method of claim 20, wherein engaging locking parts on the connector with matching lock portions on the frame comprises engaging locking parts on opposing lateral sides of the connector.

23. The method of claim 20, wherein:

the frame is a single integrated metal component; and installing the frame onto the mating surface of the printed circuit board comprises inserting projections of the frame into openings in the mating surface of the printed circuit board.

* * * * *